US007538500B2

(12) United States Patent
Moller et al.

(10) Patent No.: US 7,538,500 B2
(45) Date of Patent: May 26, 2009

(54) POSITION DETECTION AND EXTERNAL DRIVER MULTIPLEXING SYSTEM FOR DC MOTORS

(75) Inventors: David D. Moller, Westfield, IN (US); Philip K. Schneider, El Paso, TX (US); Oscar M. Alcantara, Chihuahua (MX); Salvador A. Canales, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/218,712

(22) Filed: Jul. 17, 2008

(65) Prior Publication Data
US 2008/0272715 A1 Nov. 6, 2008

Related U.S. Application Data

(62) Division of application No. 11/362,643, filed on Feb. 27, 2006, now Pat. No. 7,474,068.

(51) Int. Cl.
*H02P 1/54* (2006.01)
(52) U.S. Cl. .......................................... 318/34; 318/66
(58) Field of Classification Search .................. 318/34, 318/49, 66, 112, 599, 569
See application file for complete search history.

(56) References Cited
U.S. PATENT DOCUMENTS

| 4,641,067 | A | | 2/1987 | Iizawa et al. |
| 4,856,710 | A | * | 8/1989 | Takada et al. ............. 236/13 |
| 5,132,602 | A | * | 7/1992 | Jorgensen et al. ........ 318/608 |
| 5,203,499 | A | | 4/1993 | Knittel |
| 5,343,382 | A | | 8/1994 | Hale et al. |
| 5,497,326 | A | | 3/1996 | Berland et al. |
| 5,514,977 | A | | 5/1996 | Agiman |
| 5,631,528 | A | | 5/1997 | Agiman |
| 5,798,624 | A | * | 8/1998 | Wilke et al. ............... 388/809 |
| 6,078,154 | A | | 6/2000 | Manlove et al. |
| 6,262,546 | B1 | | 7/2001 | Draves et al. |
| 6,380,757 | B1 | * | 4/2002 | Draves et al. ............. 324/772 |
| 6,437,533 | B1 | | 8/2002 | Du et al. |
| 6,845,377 | B2 | | 1/2005 | Yamane et al. |
| 6,847,914 | B2 | | 1/2005 | Gerlach |
| 6,859,030 | B2 | | 2/2005 | Otte |
| 7,180,257 | B1 | | 2/2007 | Schneider et al. |
| 7,352,145 | B2 | | 4/2008 | Moller et al. |
| 2003/0155428 | A1 | * | 8/2003 | Fiegle et al. ............. 236/49.3 |
| 2005/0040782 | A1 | | 2/2005 | Jasinski et al. |
| 2007/0075657 | A1 | | 4/2007 | Moller et al. |

* cited by examiner

*Primary Examiner*—Rina I Duda
(74) *Attorney, Agent, or Firm*—Jimmy L. Funke

(57) ABSTRACT

A system and method is provided for improved monitoring and controlling of mechanically commutated DC motors. The system and method include DC motors, pulse-count driver circuitry for driving the motors, motor position sensing circuitry, and motor control circuitry. The system and method provide for improved motor current waveform sensing that is able to effectively reject false brake pulses, avoid erroneous processing due to fluctuating battery voltage levels, and reduce the sensitivity to variations in motor current signals due to dynamic motor load, manufacturing variation, system aging, temperature, brush bounce, EMI, and other factors. The system and method also include an improved ability to multiplex additional external motor drivers to the motor control circuitry, select between sequential and simultaneous drive modes using an SPI bit, and monitor the system controller for an error condition and simultaneously driver motors in response to the error condition.

14 Claims, 20 Drawing Sheets

| DIRECTION | uPROC CONTROL OUTPUTS ||| OUT 3/4N | OUT 3/4P | OUT 3/4N | OUT 3/4P | EXTERNAL FET's ||||
| | MIC 3/4 | MIC 5/6 | MIC 5/6 DIS | M1 | M2 | M3 | M4 | M1 | M2 | M3 | M4 |
|---|---|---|---|---|---|---|---|---|---|---|---|
| CCW | L | L | L | OFF | OFF | OFF | ON | OFF | ON | OFF | ON |
| CW | H | L | L | OFF | OFF | ON | OFF | ON | OFF | ON | OFF |
| CCW | L | H | L | ON | ON | OFF | ON | ON | ON | OFF | OFF |
| CW | H | H | L | ON | OFF | ON | OFF | ON | OFF | OFF | OFF |
| CCW | L | H | H | OFF | ON | OFF | ON | OFF | OFF | OFF | OFF |
| CW | H | L | H | OFF | OFF | ON | OFF | OFF | OFF | OFF | OFF |
| CCW | L | L | H | OFF | OFF | OFF | ON | OFF | OFF | OFF | OFF |
| CW | H | L | H | OFF | OFF | ON | OFF | OFF | OFF | OFF | OFF |

FIG. 16

| | FET | OUT 1 | | OUT 2 | | OUT 3 | | OUT 4 | | ALL IN BRAKE | CNOP |
|---|---|---|---|---|---|---|---|---|---|---|---|
| | | CW | CCW | CW | CCW | CW | CCW | CW | CCW | | |
| OUT 1 | M1 | OFF | ON | ON | OFF | ON | OFF | ON | OFF | OFF | OFF |
| | M2 | ON | OFF | OFF | OFF | OFF | OFF | OFF | OFF | OFF | ON |
| | M3 | ON | OFF | OFF | ON | OFF | ON | OFF | ON | ON | ON |
| | M4 | OFF | ON | OFF | ON | OFF | ON | OFF | ON | ON | OFF |
| OUT 2 | M1 | ON | OFF | OFF | ON | ON | OFF | ON | OFF | OFF | OFF |
| | M2 | OFF | OFF | ON | OFF | OFF | OFF | OFF | OFF | OFF | ON |
| | M3 | OFF | OFF | ON | OFF | OFF | ON | OFF | ON | ON | ON |
| | M4 | OFF | ON | OFF | ON | OFF | ON | OFF | ON | ON | OFF |
| OUT 3 | M1 | ON | OFF | ON | OFF | OFF | ON | ON | OFF | OFF | OFF |
| | M2 | OFF | OFF | OFF | OFF | ON | OFF | OFF | OFF | OFF | ON |
| | M3 | OFF | OFF | OFF | ON | ON | OFF | OFF | ON | ON | ON |
| | M4 | OFF | ON | OFF | ON | OFF | ON | OFF | ON | ON | OFF |
| OUT 4 | M1 | ON | OFF | ON | OFF | ON | OFF | OFF | ON | OFF | OFF |
| | M2 | OFF | OFF | OFF | OFF | OFF | OFF | ON | OFF | OFF | ON |
| | M3 | OFF | OFF | OFF | ON | OFF | ON | ON | OFF | ON | ON |
| | M4 | OFF | ON | OFF | ON | OFF | ON | OFF | OFF | ON | OFF |

FIG. 22

POSITION DETECTION AND EXTERNAL DRIVER MULTIPLEXING SYSTEM FOR DC MOTORS

CROSS-REFERENCE TO RELATED APPLICATION

This application is a divisional application of U.S. Ser. No. 11/362,643, filed Feb. 27, 2006 now U.S. Pat. No. 7,474,068.

TECHNICAL FIELD

The present invention generally relates to the control of electric motors, and more particularly, to effective and efficient monitoring and control of brush-type DC motors.

BACKGROUND OF THE INVENTION

As technology has progressed, the use of electric motors to perform numerous tasks previously accomplished manually has increased dramatically. For example, a simple manual task like rolling down a vehicle window is performed by the simple push of a button, with a motor performing the actual work of rolling down the window. The manual action of opening or closing car vents to redirect hot or cold air to various locations is performed simply by changing a temperature setting on a control panel. Examples of the use of motors both inside and outside the automobile field to perform tasks like these abound.

Brush-type DC motors, such as mechanically commutated motors, have been found to be especially useful for controlling, for example, the flow of air in vehicle heating, ventilating and air conditioning (HVAC) systems. With the proliferation of such motors in various applications comes the increased need to accurately, effectively, and efficiently control the motors. Some applications, including many vehicle HVAC systems, require that both the direction and amount of rotation of multiple brush-type DC motors be accurately measured and controlled in order for the systems to function effectively. In addition to requiring the ability to control these aspects of motors, most manufacturers are driven by the market to search for ways to minimize the costs of the motors and their associated control systems.

Several methods for monitoring the performance of brush-type DC motors and effectively controlling them have been described in U.S. patents. One method, based on detection of the rapid change in current (i.e., falling edge, interruptions, discontinuities, or fluctuations) due to the commutation process, is commonly referred to as commutation spike or ripple detection. In a conventional pulse count system, commutation spikes are detected in the current waveform characteristics of a brush-type DC motor and used as feedback signals to determine the rotor position. This concept is based on the general principle of detecting the rapid change in current due to the periodic commutation process of a rotating motor. The basic schemes typically consist of sensing the motor current and then conditioning the sensed signal by various techniques such as filtering and amplification or by differentiation. The processed signal is then amplitude qualified by comparing it to a detection threshold, which triggers a pulse generator. The digital pulse can be fed back to a microcontroller for further processing of the rotor position information. This additional processing can include, for example, using the current position of the motor to determine the nature of control signals that should be sent to this or other motors in the system.

Conventional methods of commutation spike detection generally rely on motor current waveform characteristics, which can be highly variable due to a number of factors. These factors include motor manufacturing tolerances and aging effects, dynamic motor loading, temperature effects, and supply voltage fluctuation. Signal degradation due to brush bounce and other noise caused by motor aging can be a major cause of accuracy and reliability concerns. Another drawback is the susceptibility of detection circuitry to electromagnetic interference (EMI), cross-talk and other sources of noise. Detection thresholds must be set to the minimum motor current amplitude, resulting in poor signal to noise ratios and susceptibility to noise in very light load conditions. In addition, applications using asymmetric (unbalanced) magnetized motors are often sensitive to very light and assisted loads, which can result in very unreliable commutation characteristics requiring prediction techniques to achieve desired accuracy.

Another drawback with using a conventional commutation spike detection scheme for determining the shaft position in DC motors relates to the system voltage level. For example, in an automobile application, at higher battery levels, motor speed is proportionally faster than it is at lower battery voltage levels. A conventional commutation spike detection scheme generates an output pulse (e.g. one-shot) for each qualified commutation spike. A blanking or "dead" time following the one-shot output is often used to provide additional noise immunity, which prevents inadvertent triggering on high frequency noise that often precedes a commutation event, resulting in the generation of false pulses. To avoid generating false pulses, the duration of one-shot and blanking-time signals needs to linearly track the motor speed, which is dependant on the battery voltage level.

An additional drawback with a commutation spike detection scheme occurs when the motor is braked. In a typical brush-type DC motor application, motor braking is accomplished by short circuiting the windings of the motor. For an H-bridge configuration, this is normally accomplished by turning on both low-side drivers or both high-side drivers and turning off the opposite half of the H-bridge. At the moment the motor windings are shorted, the energy stored in the motor windings will generate a significant kickback voltage, which contains the same frequency content as the commutation spike. If the brake command is processed after the blank time of a valid commutation event, a false trigger will often be generated. This is known as a "false brake pulse", and results in an error in pulse counting. Because the control logic that sends the "brake" signal is asynchronous relative to the spike detection circuitry, the inductive kickback due to the shorting of the motor windings in response to a "brake" signal can be detected as a false event, resulting in an error in pulse counting. Due to motor speed and the processing complexity required to synchronize a brake command with the pulse detection circuitry, implementation of a system to reject false brake pulses can be difficult. What is needed is a simple and effective means to synchronize the motor control and pulse detection logic in a circuit that rejects false brake pulses.

In addition to facing the above-described limitations in detecting and processing signals, developers and manufacturers of systems requiring multiple brush-type DC motors also face problems of controlling the motors with optimum efficiency and cost. While pulse count technology serves as a low-cost actuator position feedback alternative to potentiometer feedback or optical encoder systems, there is still a need to minimize the cost of this technology. There have been attempts to integrate the circuit elements for control logic, signal processing, feedback, and power stages of the motor control system into a single package. For the power stage, an H-bridge topology is typically employed for each motor to be driven. The number of driver channels is typically limited to between 1 and 4 due to the size and cost of the power transistors required for the H-bridge circuits, the number of motors per system, and the number of systems. It is generally not cost effective to have more than one spare channel driver in a given motor drive circuit or integrated circuit (IC) in the conventional system.

When system requirements dictate the need for more driver channels than are available in a single IC package, the designer is often faced with a tradeoff between using additional ICs and wasting the spare channels (since not all channels on the new IC are needed), or alternatively using more costly discrete driver technology. In pulse count applications that use a sequential drive scheme (i.e., individual high-side drivers with common low-side transistor pairs that allow for one motor to operate at a time), this can be accomplished by adding an external high-side driver pair and sharing the common return inside the IC, for example. While this solution is simple, it is limited in performance because only one motor can be controlled at a time, and also because adding additional drivers increases the total system throughput time. This situation often typically makes it impossible to take advantage of the low cost of pulse count systems in high-end systems, where throughput is critical to total performance.

Finally, in applications requiring bi-directional control of multiple motor actuators, such as those found in automotive climate control systems, for example, design teams are often faced with making another tradeoff between system cost and system performance. In DC motor applications employing bi-directional motor control, an H-bridge power stage configuration is often employed. An H-bridge configuration typically consists of four power switches, such as field-effect transistors (FETs) or bipolar junction transistors (BJTs), arranged in a configuration resembling the letter "H." The upper legs, commonly referred to as the high-side of the bridge, typically consist of two top switches connected between a common supply voltage and both motor terminals. The lower legs, commonly referred to as the common or low-side of the bridge, typically consist of two bottom switches connected between both motor terminals and ground. The motor is usually located in the middle, and its state of operation is controlled by the state of the power switches.

With the H-bridge motor control configuration, to drive the motor in the forward direction, the high-side driver connected to the positive terminal of the motor, and the low-side driver connected to the negative terminal of the motor, are turned on to allow electric current to flow through the motor coils. To drive the motor in the reverse direction, the polarity of the motor is reversed by turning on the opposite high- and low-side drivers, and reversing the direction of current flow. Braking is achieved by shorting the motor coils by turning on both low-side drivers and turning off both high-side drivers.

To reduce cost in systems controlling multiple motors, H-bridges are often integrated into a single package, along with associated control circuitry. To further reduce system cost, a sequential drive scheme can be chosen to allow a further reduction in drivers and wiring. This approach consists of having multiple motors share a common low-side driver of the H-bridge while retaining individual high-side drivers for each motor. This approach results in a benefit of reducing system cost because of the reduction in the amount of wire required due to the common wiring connection to the low-side. However, there is a significant impact on the response time which can degrade system performance.

When system performance is critical, a simultaneous drive scheme may be adopted. However, this does not allow for selectable configuration of simultaneous or sequential drive operation in a single package. Therefore, the designer is forced either to have two different driver solutions to meet the challenges of various customers, or to limit itself to a single solution that is either not cost effective and/or of limited performance. A single driver configuration is needed that allows the capability of selecting either a sequential operation when system performance is not critical and low cost is important, or a simultaneous operation when system performance is critical and the cost can be justified.

In addition, designers implementing motor driver solutions are often required to meet various standards. For example, designers implementing solutions for vehicle HVAC systems must meet certain standards relative to how the system responds during failure modes. It is therefore desirable for the system to support fail-safe features necessary to meet various standards.

SUMMARY OF THE INVENTION

In accordance with one aspect of the present invention, a method and system for eliminating or significantly reducing the sensitivity to noise and variation in motor current waveform characteristics (e.g. amplitude and shape) caused by, for example, motor aging and dynamic load conditions, is provided. The method and system are not dependent on the high-frequency characteristics of the motor current waveform produced by the rapid change in current during commutation. The method and system use relative maximum and minimum values of motor sinusoidal current levels typically caused by the time-varying back-EMF generated due to the relationship of the rotor position with the magnetic flux, along with adaptive thresholds, to generate pulses representing incremental angular displacement of the rotor used to determine motor shaft position.

In accordance with another aspect of the present invention, a method and system for a motor position detection system and method that is less sensitive to the system battery voltage is provided. The method and system utilize an oscillator, with its current reference set by an external resistor tied to the battery voltage, to alter one-shot and blanking time with changes in the battery voltage levels. At least one of frequency and duration of the pulses issued by the pulse-generating circuitry is varied linearly as a function of the system battery level.

In accordance with yet another aspect of the present invention, a method and system for controlling braking of a motor so as to avoid false brake pulses in a motor position detecting system is provided. The method and system involve synchronizing the motor control input signals with the pulse detection circuitry in order to mask false brake pulses. The method includes the steps of operating motor control circuitry of the brush-type DC motor with motor position detecting circuitry, and monitoring the motor position detecting circuitry in the motor control circuitry for presence of a blanking time signal. The method also includes the steps of detecting the presence of a blanking time signal and issuing a braking signal from the motor control circuitry, when the motor control circuitry detects that the motor position detecting circuitry is issuing a blanking time signal. The duration of the braking signal is less than the duration of the blanking time signal issued by the motor position detecting circuitry.

In accordance with still another aspect of the present invention, a method and system for multiplexing external motor drivers to a pulse count driver with a simultaneous drive scheme is provided. The method and system utilize additional discrete circuitry to extend the driver capability of a pulse count driver supporting multiple channels and DC motors, to control additional channels and DC motors, with the ability to drive a plurality of the channels simultaneously.

In accordance with yet another aspect of the present invention, a method and system for allowing the selectable configuration of a multiple H-bridge driver so that it can be used in either a sequential or simultaneous drive configuration is provided. In the simultaneous mode, all H-bridges will respond to their individual control inputs and work independently of the state of the other H-bridges. In the sequential mode, all H-bridges will share a common bottom side, allowing for elimination of extra wires required in simultaneous driver mode. In this mode, the operation of individual H-bridges will be dependent on the state of the others due to the common bottom side. The driver configuration will be determined by the state of a single serial peripheral interface (SPI) control input bit.

In according with yet another aspect of the present invention, a method and system for allowing the motor control circuitry to respond in a predetermined method in response to a system failure is provided. According to this aspect of the present invention, motor control circuitry is configured to monitor a bit from an external control circuit. That bit indicates when external control circuitry is not operating properly. When the motor control circuitry determines that the external circuitry is not operating properly, it drives the motors that it controls to predetermined positions.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 16 is a state definition matrix illustrating the state of various system components in the motor control system shown in FIG. 15;

FIG. 22 is a state definition matrix showing the state of various circuitry employed in the motor control system of FIG. 18.

DESCRIPTION OF THE PREFERRED EMBODIMENTS

Figure 1:
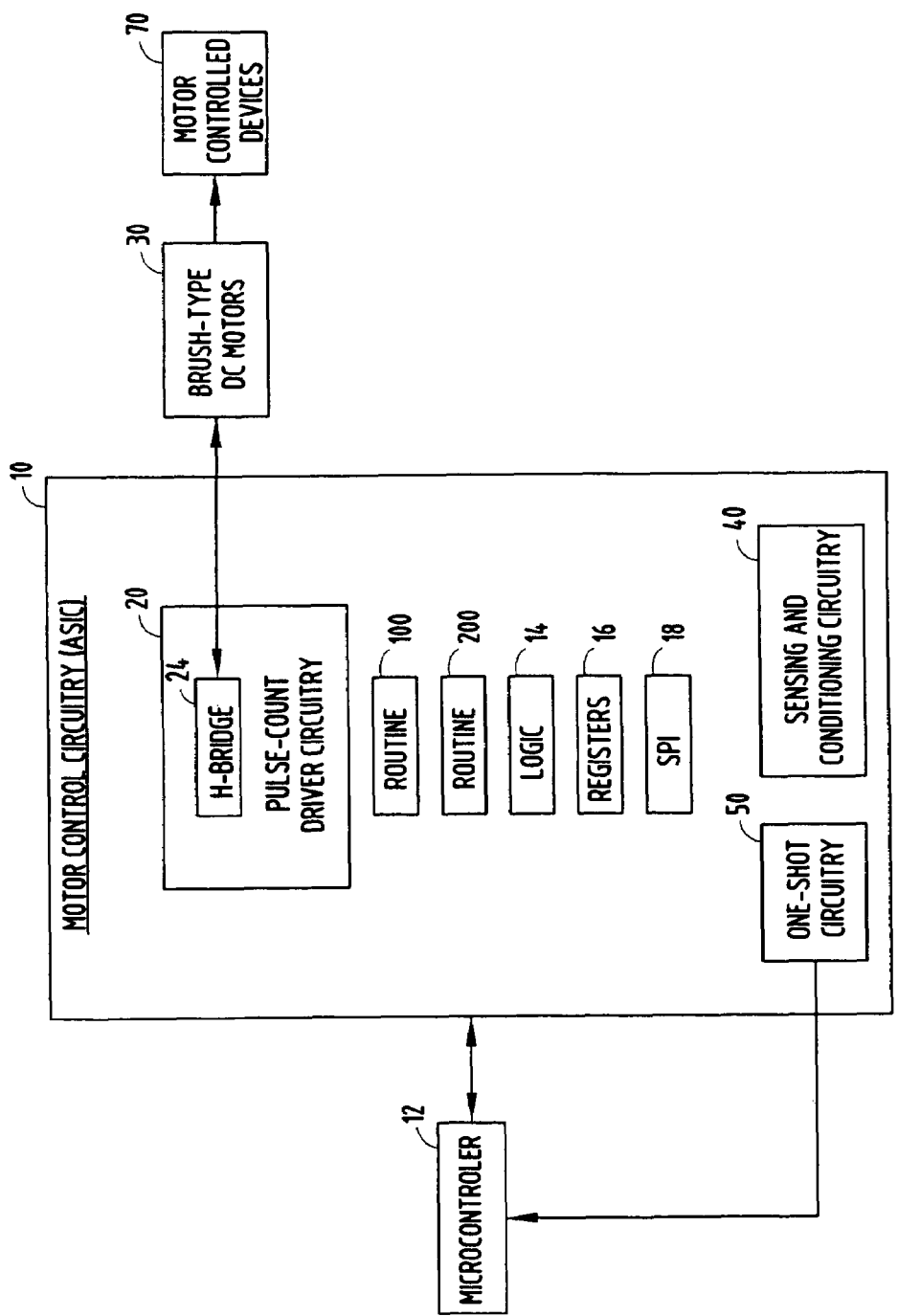
FIG. 1 is a block diagram illustrating an electrical motor control system controlling mechanically commutated DC motors, according to a first embodiment of the present invention.

Referring to FIG. 1, an electrical motor control system is generally illustrated controlling brush-type DC motors 30, which, in turn, actuate motor controlled devices 70. The motor control system generally includes a microcontroller 12 and motor control circuitry 10 in the form of an application specific integrated circuit (ASIC). The motor control circuitry 10 includes pulse count driver circuitry 20, sensing and detection circuitry 40, one-shot circuitry 50, and control logic 12. The motor control system may be used to control electrical DC motors in any number of applications, including, for example, actuation of air duct doors in automobile HVAC systems.

The motor control system is generally shown controlling brush-type DC motors 30. Brush-type DC motors 30 are typically permanent magnet DC motors with brushes. Brush-type DC motors are typically mechanically commutated. Brush-type DC motors have a rotor (armature) and a stator (permanent magnet or field coils) that cause the motors to rotate when electrical signals are applied. The motor control system and control methodology may be employed to control any of a number of one or more brush-type DC motors 30 and monitor the motor position (e.g., motor rotor or shaft position) for use in any of a number of applications. Motors 30 are typically connected to any number of motor control devices 70 for a given application.

The microcontroller 12 may include a general purpose controller or a specifically configured controller for controlling the overall operation of the DC motors 30 for one or more applications. The microcontroller 12 monitors the output of the ASIC 10 and generates command signals to drive and brake any number of the motors, based on a motor control routine of a given application. Microcontroller 12 may take the form of a controller employing a microprocessor and memory. The microprocessor may include a conventional microprocessor having the capability for processing routines and data. The memory may include read-only memory ROM, random access memory RAM, flash memory, and other commercially available volatile and non-volatile memory devices. Stored within the memory may be data and routines. Microcontroller 12 may alternately be in the form of alternative digital and/or analog circuitry.

The motor control circuitry 10 receives control command signals from microcontroller 12, drives the DC motors 30, and monitors sense current passing through the DC motors 30. The motor control circuitry 10 may take the form of integrated circuitry, such as an ASIC, or other analog and/or digital circuitry. The motor control circuitry 10 may be implemented in a separate dedicated microcontroller having a microprocessor and memory, or may be implemented in a shared controller, such as microcontroller 12.

The motor control circuitry 10 is generally shown having logic 14 for processing data and executing control routines 100 and 200, pulse count driver circuitry 20 capable of receiving signals from logic 14 and driving external motors via H-bridge 24, one-shot circuitry 50 capable of issuing pulses to pulse count driver circuitry 20 and microcontroller 12, and sensing and detection circuitry 40 for monitoring motor current via H-bridge 24 and issuing signals to one-shot circuitry 50. The elements comprising motor control circuitry 10, including pulse count driver circuitry 20, one-shot circuitry 50, H-bridge 24, routines 100 and 200, logic 14, registers 16 and SPI circuitry 18, and sensing and detection circuitry 40 may be implemented using discrete components, as a stand-alone integrated circuit, or as part of a more comprehensive integrated circuit providing a variety of functions.

To control the DC motors 30, pulse count driver circuitry 20 employs an H-bridge power stage 24, according to one embodiment. An H-bridge generally includes four power switches, such as FETs or BJTs arranged in a configuration resembling the capital letter H (see FIG. 13 for an example of an H-bridge 24 connected to a motor 30). The upper two legs of the H-bridge, commonly referred to as the high-side of the bridge, include two top switches connected between a common supply voltage and both motor terminals. The lower two legs, commonly referred to as the common or low-side of the bridge, include two bottom switches connected between both motor terminals and ground. The motor(s) is located in the middle and, therefore, the motor state of operation is controlled by the state of the power switches implemented in the pulse count driver circuitry 20 and H-bridge 24.

To drive the motor(s) in the forward direction, the high-side driver connected to the positive terminal and the low-side driver connected to the negative terminal of the motor are turned on to allow current to flow through the motor coil. To drive the motor(s) in the reverse direction, the polarity applied to the motor(s) is reversed by turning on the opposite high and low-side drivers and reversing the direction of current flow. Braking is achieved by shorting the motor coils by turning on both low-side drivers and turning off both high-side drivers or vice versa. The pulse count driver circuitry 20 may take the form of multiple H-bridges integrated into a single package, along with control circuitry to receive motor control signals from external devices and control the H-bridges for a plurality of brush-type DC motors.

Figure 2:
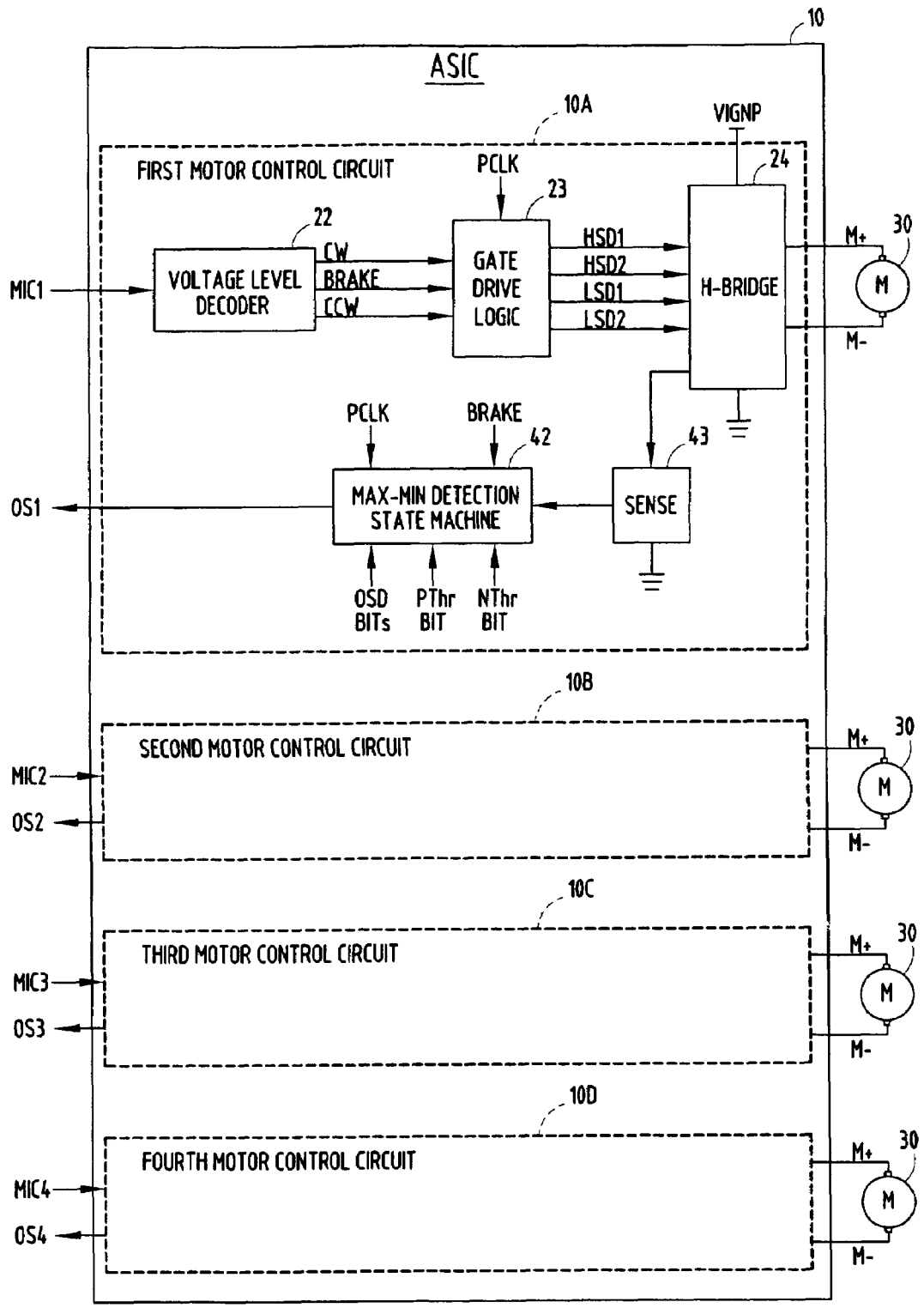
FIG. 2 is a block diagram further illustrating the motor control circuitry for controlling multiple motors.

The motor control system in FIGS. 1 and 2 is also generally shown having sensing and detection circuitry 40 for assisting in the determination of the rotor position of brush-type DC motors 30. One circuitry block within sensing and detection circuitry 40 detects and conditions motor current levels from motors 30. In addition to detecting and conditioning the output current from motors 30, sensing and detection circuitry 40 also issues triggers to one-shot circuitry 50, based on the condition signals from motors 30. One-shot circuitry 50 produces a digital pulse output of a specified length, based on triggers received from sensing and detection circuitry 40. One-shot circuitry 50 also issues a dead-time signal of a specific duration to improve noise immunity and simplify the interface of one-shot circuitry 50 to off-chip digital logic.

The motor control system generally illustrated shows the output from one-shot circuitry 50 being provided to microcontroller 12 for use in determining the position (motor rotor or shaft position) of brush-type DC motors 30. Sensing and detection circuitry 40 may be implemented with discrete components, may take the form of a dedicated integrated circuit, or may be incorporated into a more general purpose integrated circuit providing additional functions. One-shot circuitry 50 may be implemented using discrete components, may be implemented in the form of a dedicated integrated circuit, or may be integrated into a more general purpose integrated circuit providing additional functions. Microcontroller 12, pulse count driver circuitry 20, H-bridge 24, one-shot circuitry 50, and sensing and detection circuitry 40 may all be combined together in one dedicated integrated circuit, or into a more general-purpose integrated circuit (e.g., microcontroller) providing additional functions.

FIG. 2 illustrates a block and circuit diagram showing an ASIC used to implement the motor control circuitry 10 to perform certain aspects of the present invention. ASIC 10 is generally shown having a first motor control circuit 10A, a second motor control circuit 10B, a third motor control circuit 10C, and a fourth motor control circuit 10D. Each of these motor control circuits is shown controlling a brush-type DC motor 30. The discussion of the components in first motor control circuit 10A will also apply to second motor control circuit 10B, third motor control circuit 10C, and fourth motor control circuit 10D. First motor control circuit 10A is shown having a voltage level decoder 22 for decoding signals received from a microcontroller, gate drive logic 23 for receiving signals from voltage level decoder 22 and providing control signals to H-bridge 24, and an H-bridge 24 for driving motor 30. First motor control circuit 10A is also shown having a sensing circuit 43 for sensing the current provided to motor 30 by H-bridge 24 and for providing a voltage signal to MAX-MIN detection state machine 42. The voltage signal provided by sensing circuitry 43 to MAX-MIN detection state machine 42 corresponds to the instantaneous motor current sensed by sensing circuitry 43. The configuration of MAX-MIN detection state machine 42 is determined by one-shot duration (OSD) bits, positive threshold (PThr) bits, negative threshold (NThr) bits and brake threshold (BThr) bits. MAX-MIN detection state machine 42 is also shown receiving a peripheral clock signal PCLK and a brake signal. MAX-MIN detection state machine 42 is also shown sending an output one-shot pulse OS1 which is applied to the microcontroller.

Figure 3:
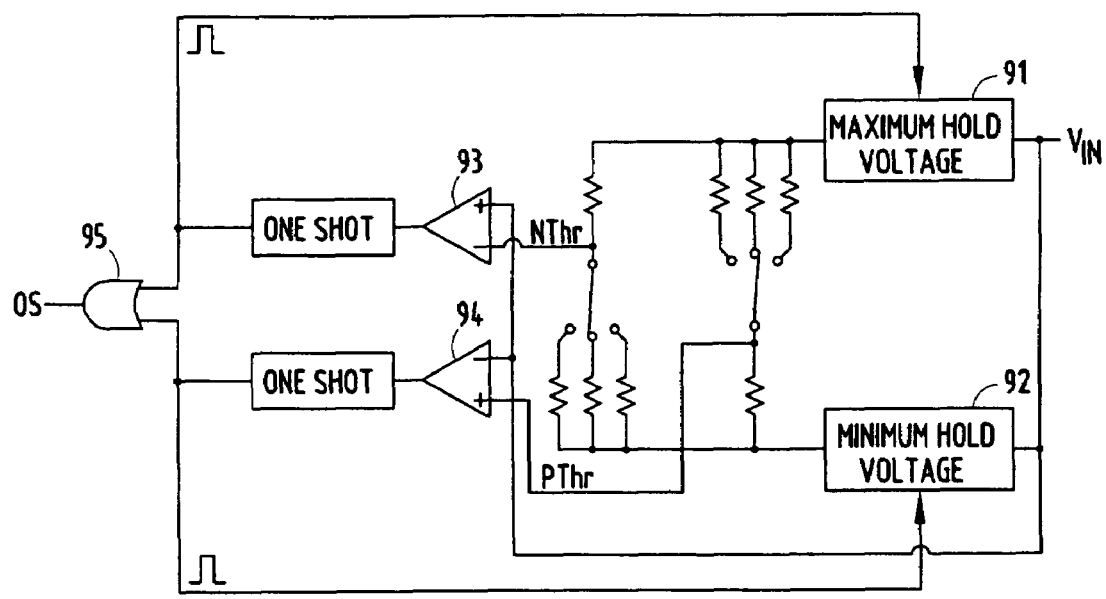
FIG. 3 is a block/circuit diagram illustrating an analog circuit implementation for a MAX-MIN detection circuit of the motor control circuit, according to one embodiment of the present invention.

FIG. 3 illustrates an analog implementation of MAX-MIN detection state machine 42 illustrated in FIG. 2, according to one embodiment of the invention. Maximum hold voltage block 91 detects and holds maximum voltage levels of VIN, while minimum hold voltage block 92 detects and holds minimum voltage levels of VIN. As noted above, VIN shown in FIG. 3 corresponds to the current sensed by current sense circuitry 43 from H-bridge 24, as shown in FIG. 2. The values of maximum hold voltage 91 and minimum hold voltage 92 pass through a resistor divider network as a negative threshold at comparator 93 and a positive threshold at comparator 94. Comparators 93 and 94 compare the negative threshold and positive threshold with the input voltage. When comparator 93 determines that the input voltage has dropped below the negative threshold value or when comparator 94 has determined that the input voltage has risen above the positive threshold value, a one-shot will be issued by one-shot circuitry tied to comparators 93 and 94. The one-shot signals tied to comparators 93 and 94 are then logically ORed in OR gate 95 and output as a one-shot signal. Once a one-shot signal is issued from the one-shot circuitry tied to comparator 94, the minimum hold voltage in minimum hold voltage block 92 is reset to the current level of VIN. Once a one-shot pulse issues from the one-shot circuitry tied to comparator 93, the maximum hold voltage of maximum hold voltage circuit block 91 is reset to match the level of VIN. The result is a dynamic redetermination of maximum and minimum hold voltages leading to variable positive and negative threshold levels. This results in one-shot circuitry that is less sensitive to spurious current and voltage fluctuation.

It should be noted that the various resistor values in resistor divider network can be changed to vary the one-shot triggering levels. Although FIG. 3 shows an analog implementation of the MAX-MIN detection state machine, according to one embodiment of the invention, other analog and digital implementations are possible, including implementations using software.

In addition, although FIGS. 1-2 show motor control circuitry 10 being implemented in an ASIC, it should be appreciated that the various functions performed by motor control circuitry 10 could be implemented using discrete components, integrated circuits, and/or a microprocessor connected to memory and having I/O and the capability to execute routines 100 and/or 200.

The operation of the motor control system generally illustrated in FIG. 1 is now discussed according to one embodiment of the present invention. The brush-type DC motors 30 are caused to rotate, based on voltage applied to the motor terminals by the H-bridge 24 of pulse count driver circuitry 20. Sensing and detection circuitry 40 detects and conditions the current levels applied to motors 30 by H-bridge 24 by determining relative maximum and minimum motor current levels in the detected signals from motors 30, and using those relative minimum and maximum levels to establish an adaptive threshold. Optionally, a portion of this current is low-pass filtered prior to reaching sensing and detection circuitry 40. Once sensing and detection circuitry 40 determines that the electric current from motors 30 has reached an adaptive threshold, pulses are generated by sensing and detection circuitry 40 to one-shot circuitry 50.

By monitoring relative maximum and minimum values of the current flowing in the motors 30 controlled by the state of the H-bridge 24 and using that information to adapt the detection threshold used to determine rotor position, sensing and detection circuitry 40 is able to issue triggers to one-shot circuitry 50 that more accurately reflect the actual motor position of each of the DC motors 30. When one-shot circuitry 50 receives a trigger from sensing and detection circuitry 40, its outputs go low. At this point, additional pulses from sensing and detection circuitry 40 will have no effect on one-shot circuitry 50. Once enabled, the output of one-shot circuitry 50 will remain low for a predetermined duration. In addition to the one-shot pulse, there is a second dead-time of the same duration as the one-shot pulse for which the outputs of one-shot circuitry 50 will remain high, regardless of additional pulses being received from sensing and detection circuitry 40. This feature allows greater immunity to noise in sensing and detection circuitry 40, and simplifies interfacing to off-chip digital logic.

The width of the one-shot output pulse of one-shot circuitry 50, as well as its retriggering period, also known as dead-time, is determined by the frequency of a clock signal provided to one-shot circuitry 50. This frequency is typically set via an oscillator input. In the specific ASIC implementation shown in FIG. 2, the duration of the one-shot is also determined by the value of OSD bits in a register in the MAX-MIN detection state machine 42. Returning to FIG. 1, output voltage level VOH for one-shot circuitry 50 is typically set by an IOREF pin. It should be noted that a pulse from sensing and detection circuitry 40 may occur anywhere in a clock period, i.e., motor pulses are asynchronous to the internal clock of one-shot circuitry 50.

Figure 4:
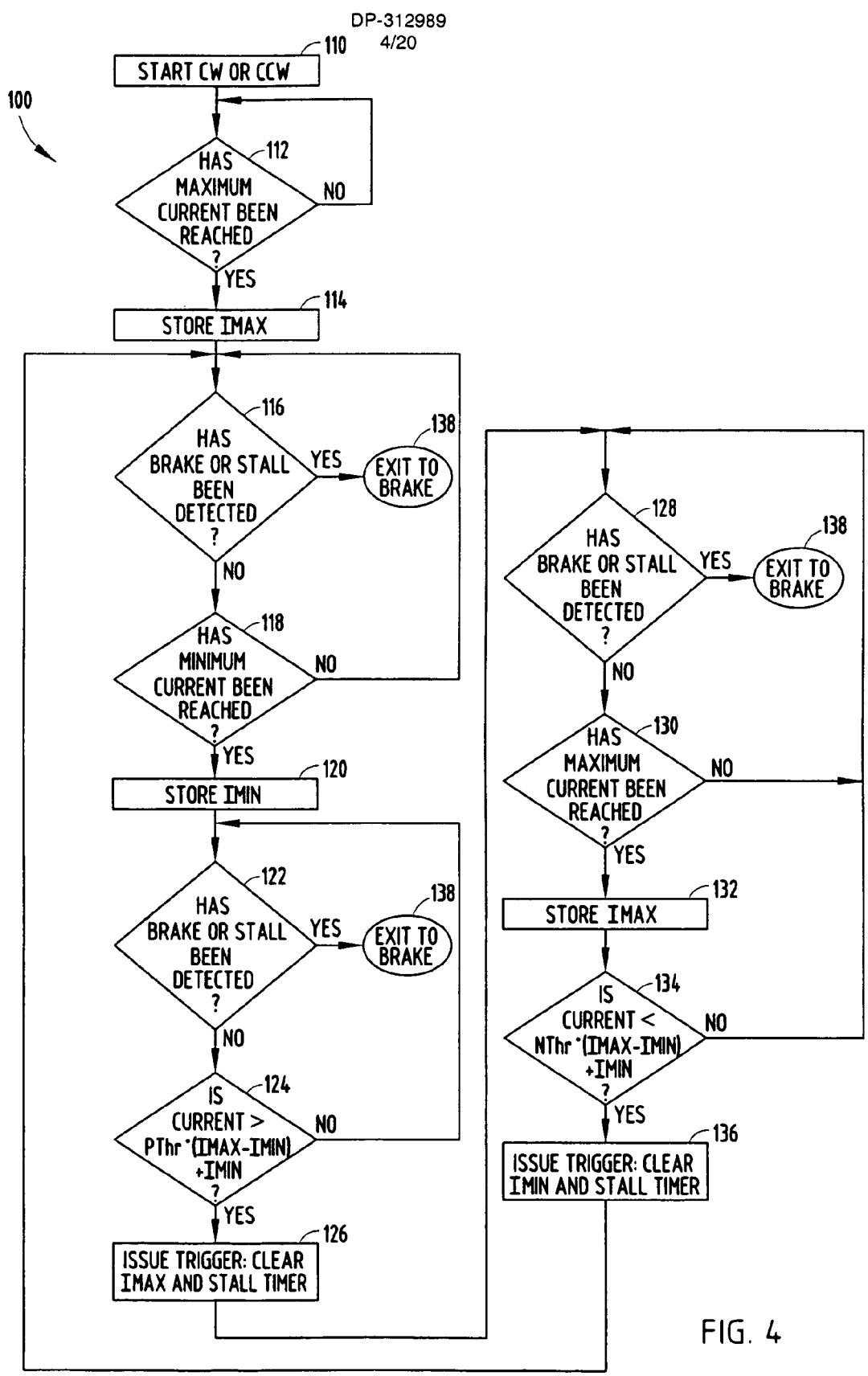
FIG. 4 is a flow diagram illustrating an electronic motor control routine, according to one embodiment of the present invention.
Figure 5:
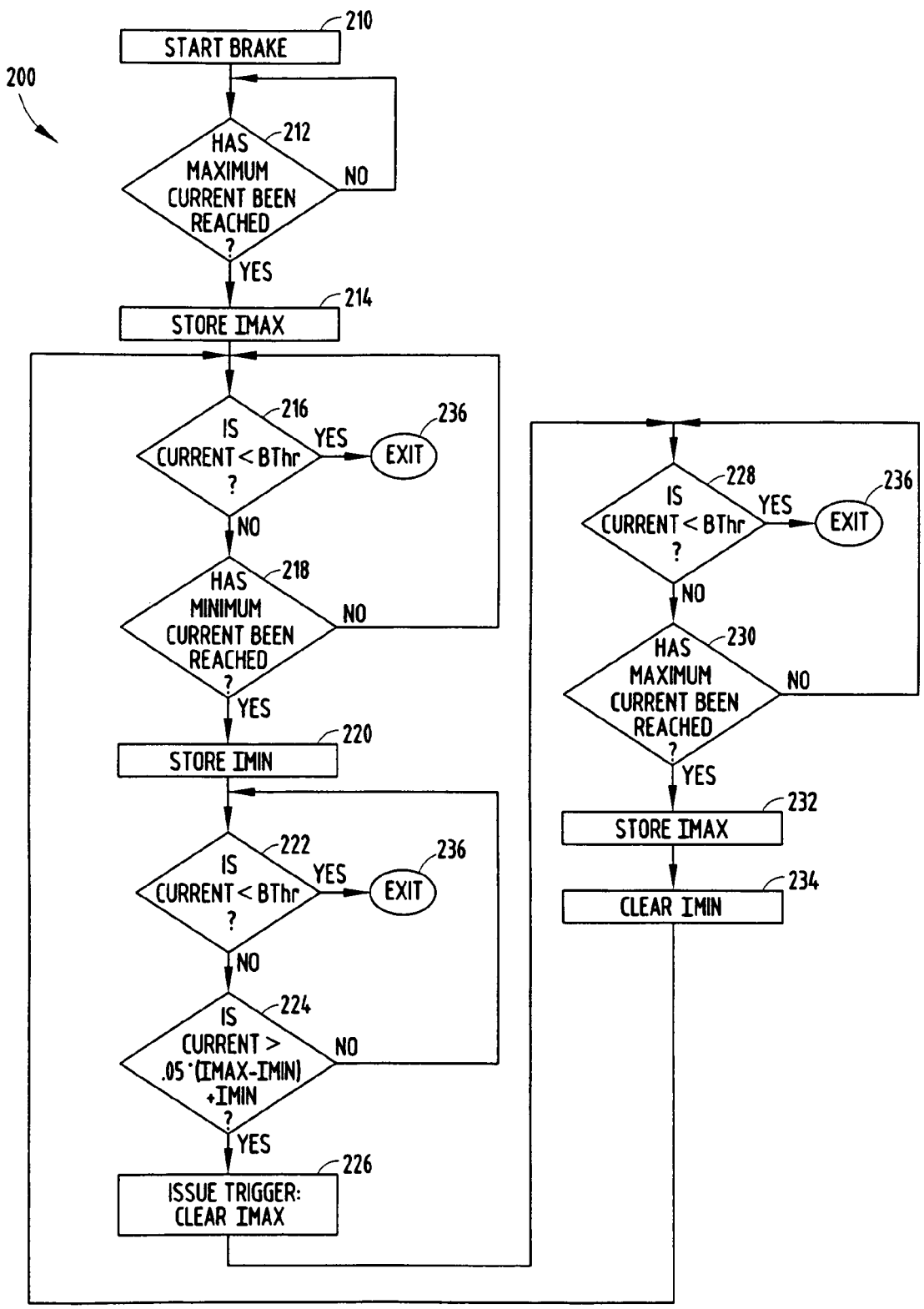
FIG. 5 is a flow diagram illustrating an electronic motor control brake routine, according to one embodiment of the present invention.

FIGS. 4 and 5 illustrate the operation of the motor control system, according to one embodiment of the present invention. It should be noted that PThr, NThr, and BThr are predefined values provided during system design or programming. Preferred values for positive threshold PThr range from, but are not limited to, 10 percent to 60 percent, with 20 percent being a preferred value, according to one embodiment of the present invention. Preferred values for negative threshold NThr range from, but are not limited to, 40 percent to 90 percent, with a preferred value being 60 percent, according to one embodiment of the present invention. Preferred values for brake threshold BThr include, but are not limited to, one divided by 64, one divided by 32, and one divided by 16, with a preferred value for BThr being one divided by 128.

FIG. 4 illustrates a motor control routine 100 for controlling the operation of motor control circuitry shown in FIG. 1 during a clockwise or counterclockwise rotation of the motor in the run mode. Routine 100 begins the run mode by starting the motor(s) in the clockwise or counterclockwise rotation in block 110. After a clockwise or counterclockwise command is issued to the motor(s), circuitry within sensing and detection circuitry 40 detects when the initial maximum current level (IMAX) is reached in decision block 112 and then stores that value in block 114. Routine 100 then checks for detection of a motor brake or stall condition in decision block 116 and, if detected, exits to the brake routine in block 138. The routine 100 also detects for whether the minimum current level (IMIN) is reached in decision block 118 and, if reached, stores the IMIN in memory. Otherwise, the routine returns to block 116. Circuitry within sensing and detection circuitry 40 may detect and hold the maximum and minimum current levels.

Once the first minimum is detected in block 118 and stored in block 120, routine 100 then checks for a brake or stall condition in block 122. If a brake or stall condition is detected, routine 100 exits to the brake routine in block 138. If a brake or stall condition is not detected, temporary maximum sample and hold circuitry that is part of sensing and detection circuitry 40 tracks the increasing current. At this point, one of two events occurs. In block 124, if the current level does not exceed PThr times the difference between IMAX and IMIN plus IMIN, routine 100 proceeds back to block 122. If, however, in block 124, the current exceeds PThr times the difference between IMAX and IMIN plus IMIN, routine 100 proceeds to block 126. In block 126, sensing and detection circuitry 40 issues an initial trigger pulse to one-shot circuitry 50 causing one-shot circuitry 50 to issue a one-shot pulse. The value stored from IMIN and the stall timer are also cleared.

After checking in block 128 for a brake or stall condition, routine 100 proceeds to block 130 and detects for a new IMAX level. If a new IMAX level has not been detected, routine 100 proceeds back to block 128. If a new IMAX level has been detected, routine 100 proceeds to block 132 and a new IMAX value is stored. Routine 100 then proceeds to block 134, where circuitry determines if the output current has fallen below NThr times IMAX minus IMIN plus IMIN. If not, routine 100 returns to block 128. If, however, the current is less than NThr times IMAX minus IMIN plus IMIN, routine 100 proceeds to block 136, where a trigger pulse is issued to one-shot circuitry 50, which, in turn, issues a one-shot pulse. In block 136, the stored values for IMIN and the stall timer are also cleared. Routine 100 then returns to block 116.

FIG. 5 illustrates a routine 200 performed by motor control circuitry generally illustrated in FIG. 1 during a braking condition. Routine 200 begins with a start braking command in block 210. Routine 200 then proceeds to block 212. Block 212 determines whether an IMAX has been reached. If not, routine 200 returns to the top of block 212 and continues to wait until a maximum current has been reached. If a maximum current has been reached, routine 200 proceeds to block 214, where the maximum current value is stored. Routine 200 then proceeds to block 216, where the current level is compared with BThr. If the current level is less than BThr, routine 200 proceeds to exit at block 236. If the current is not less than BThr, routine 200 proceeds to block 218. Block 218 determines if a minimum current level has been reached. If a minimum current level has not been reached, routine 200 proceeds to the beginning of block 216. If a minimum current level has been reached, routine 200 proceeds to block 220, where the value of the minimum current is stored. Routine 200 then proceeds to block 222.

In block 222, the current level is again compared to BThr. If the current level is less than BThr, routine 200 proceeds to block 236 exit. If the current level is not less than BThr, routine 200 proceeds to block 224. In block 224, current level is compared to 0.05 times IMAX minus IMIN plus IMIN. If the current level is not greater than this value, routine 200 proceeds to block 222. If the current level is greater than this value, routine 200 proceeds to block 226. In block 226, a trigger pulse is issued from sensing and detection circuitry 40 to one-shot circuitry 50, which then issues a one-shot pulse. Routine 200 then proceeds to block 228, where the current level is again compared to BThr. If the current level is less than BThr, routine 200 proceeds to block 236 exit. If the current level is less than BThr, routine 200 proceeds to block 230, where the current level is compared to the value of IMAX. If the value of IMAX has not been reached, routine 200 proceeds to block 228. If the IMAX level has been reached, routine 200 proceeds to block 232 and the new value for IMAX is stored. Routine 200 then proceeds to block 234, where the value for IMIN is cleared. Routine 200 then proceeds back to block 216.

Figure 6:
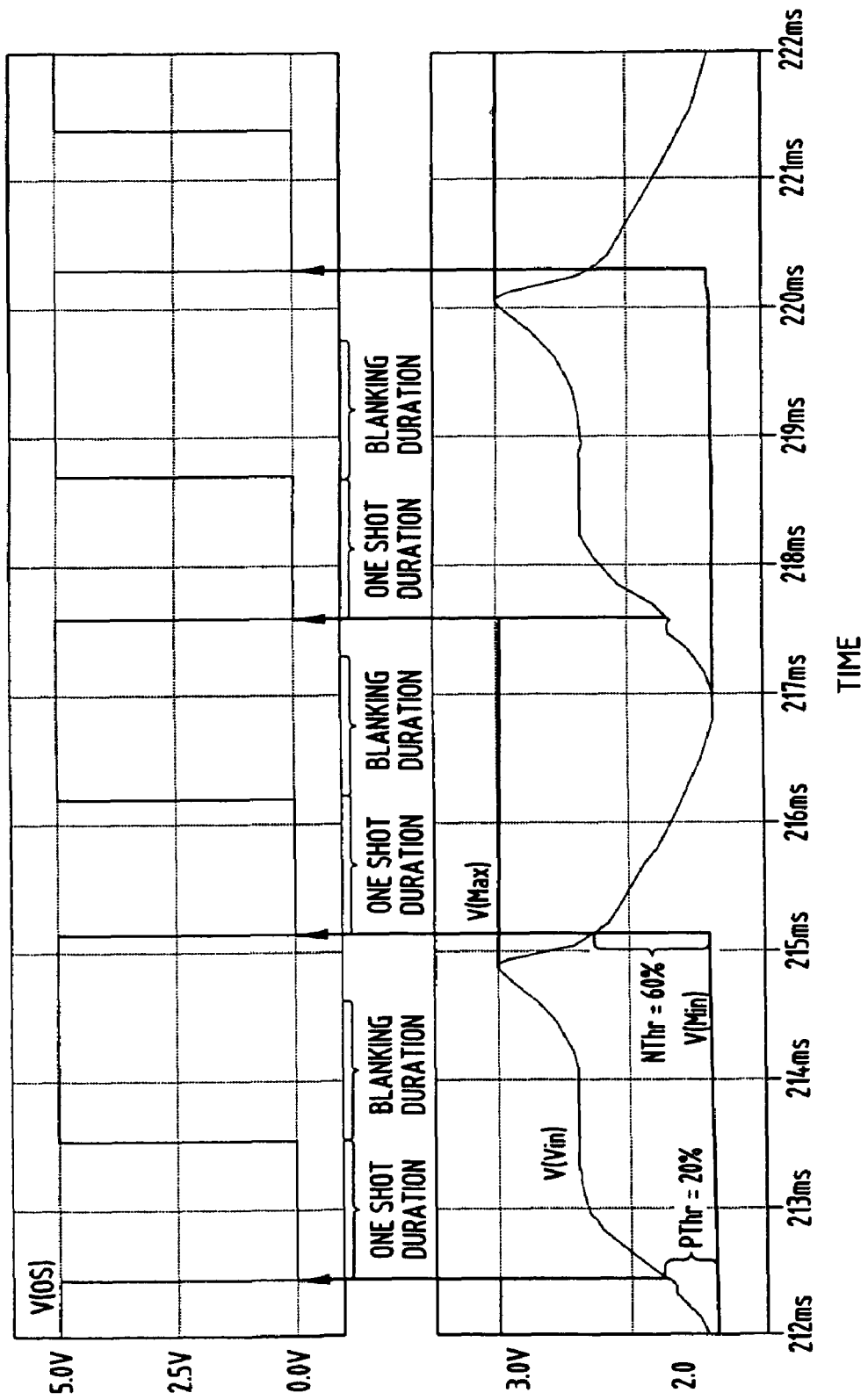
FIG. 6 is a timing diagram showing various signals relating to the steady state operation of an asymmetric motor in a system implemented according to one embodiment of the present invention.

FIG. 6 is a timing diagram showing the output of one-shot circuitry 50 and the input to sensing and detection circuitry 40 during steady state operation of an asymmetric motor. The voltage signal VIN shown in the bottom half is derived from the current provided to an asymmetric motor 30 by H-bridge 24. One-shot pulses are issued when the voltage level either rises above PThr times the difference between the maximum and minimum voltages, or falls below NThr times the difference between the maximum and minimum voltages. In this case, PThr has been selected to be twenty percent (20%) and NThr has been selected to be sixty percent (60%). As noted above, other values for PThr and NThr can be selected. In one embodiment in which an asymmetric motor is controlled, one-shot pulses are issued both when the voltage level rises above PThr times the difference between the maximum and minimum voltages and when the voltage level falls below NThr times the difference between the maximum and minimum voltages.

Figure 7:
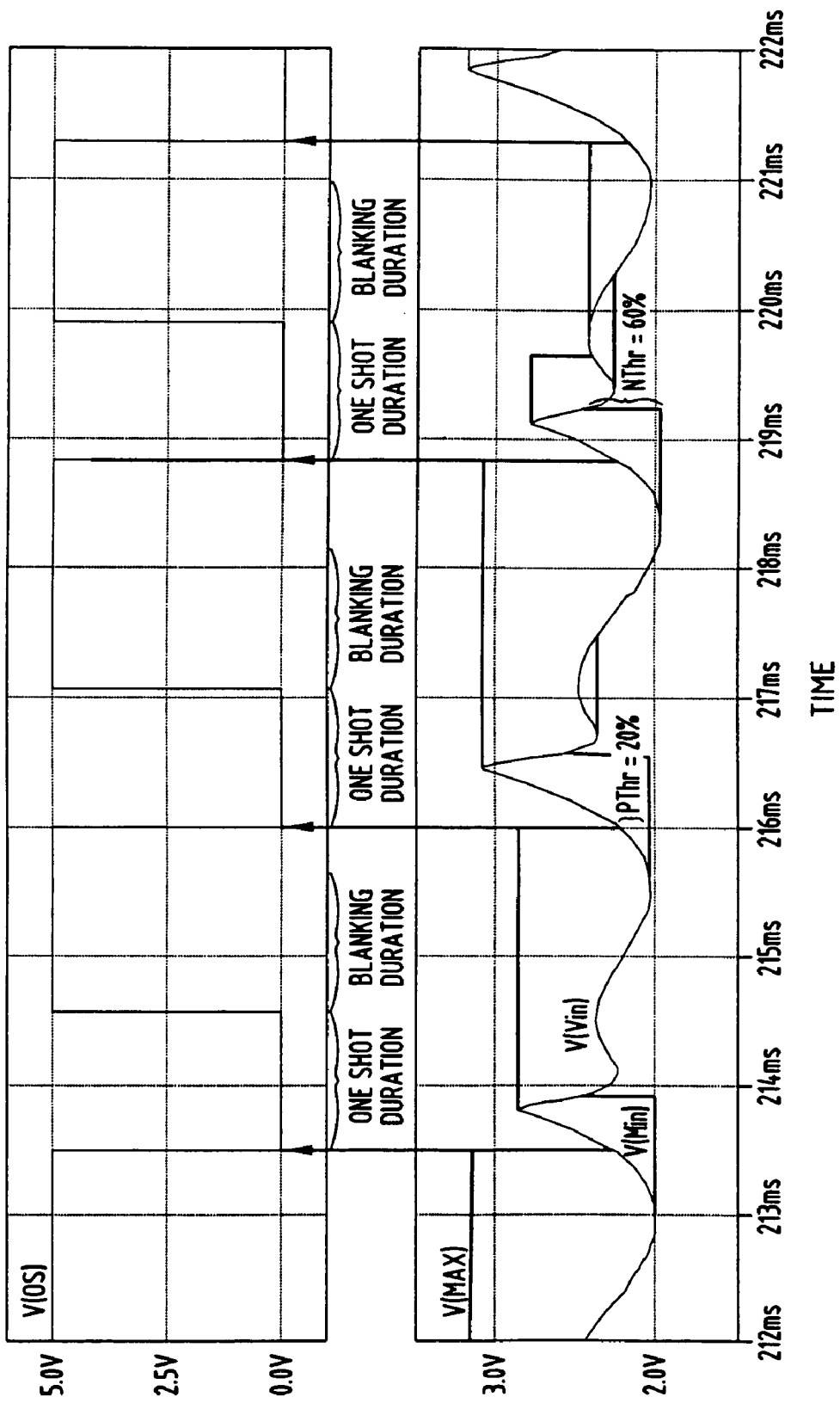
FIG. 7 is a timing diagram showing various signals associated with the steady state operation of a symmetric motor in a system operating according to one embodiment of the present invention.

FIG. 7 is a timing diagram showing the output of one-shot circuitry 50 and the input to sensing and detection circuitry 40 during steady state operation of a symmetric motor. The voltage VIN shown in the bottom half is a voltage derived from the current provided to a symmetric motor 30 by H-bridge 24. As in FIG. 6, one-shot pulses are issued when the voltage level either rises above PThr times the difference between the maximum and minimum relative voltage levels, or falls below NThr times the difference between the relative maximum and minimum voltage levels. In one embodiment in which a symmetric motor is controlled, one-shot pulses are issued only when the voltage level rises above PThr times the difference between the maximum and minimum voltages.

Figure 8:
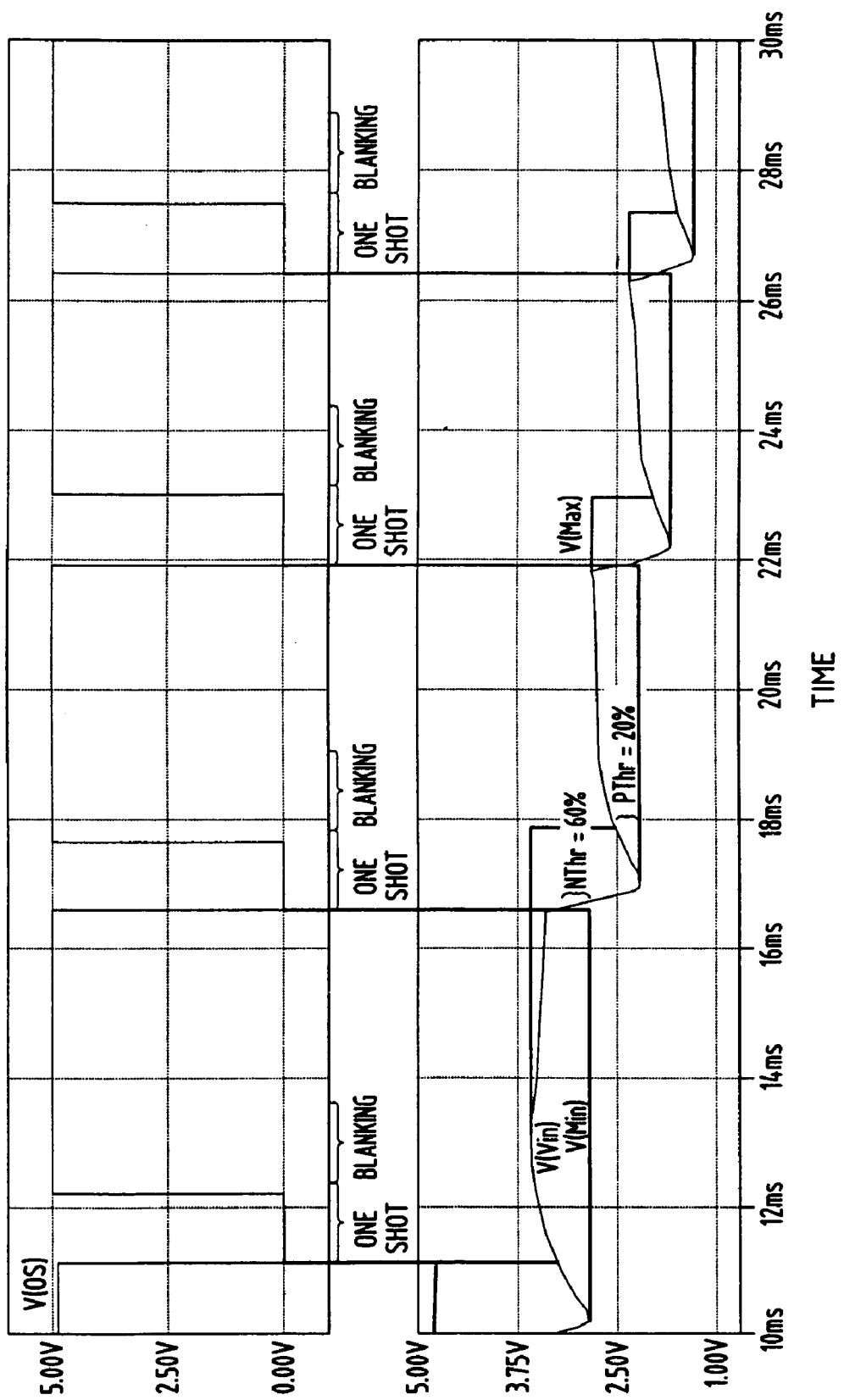
FIG. 8 is a timing diagram showing various signals associated with a motor during a starting operation in a system implemented according to one embodiment of the present invention.

FIG. 8 is a timing diagram showing the output of one-shot circuitry 50 and the input to sensing and detection circuitry 40 during a motor starting operation. VIN shown in the bottom half is a voltage derived from the current provided to motor 30 by H-bridge 24. As in FIGS. 6 and 7, one-shot pulses are issued when the voltage VIN either rises above PThr times the difference between the relative maximum and minimum values of a voltage, or falls below NThr times the difference between the relative maximum and minimum voltage levels. As with FIGS. 6 and 7, NThr and PThr can be selected to have different values.

Figure 9:
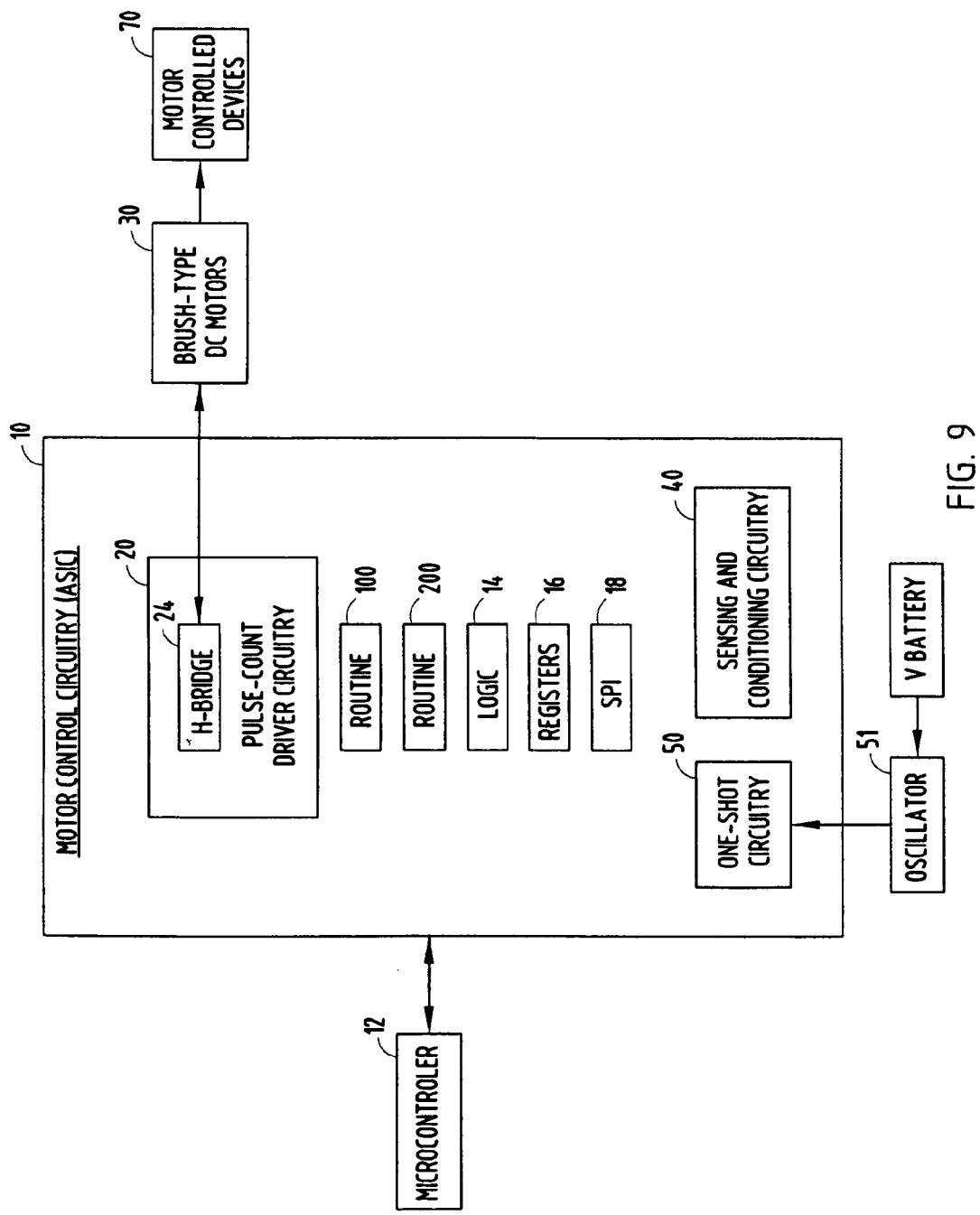
FIG. 9 is a block diagram illustrating an electronic motor control system, according to a second embodiment of the present invention.

Referring to FIG. 9, an electric motor control system is generally illustrated, according to a second embodiment of the present invention. In addition to the elements included in the first embodiment generally illustrated in FIG. 1, the motor control system in the second embodiment further includes an oscillator 51 tied to a battery voltage ($V_{BATTERY}$). The oscillator 51 is coupled to one-shot circuitry 50 to control the frequency of one-shot and blanking pulses.

The motor control system in the second embodiment operates in a manner similar to that described in the first embodiment, with the added benefit that the oscillator 51 tied to the battery voltage ($V_{BATTERY}$) causes the one-shot and blanking time of one-shot circuitry 50 to vary linearly with the voltage of the battery. This is because pulses output by one-shot circuitry 50 are coordinated with a PCLK signal derived from the oscillator 51. As the battery voltage changes, the oscillator 51 frequency changes, causing the PCLK input signal frequency to change, and varying the resulting one-shot frequency and duration.

Figure 10:
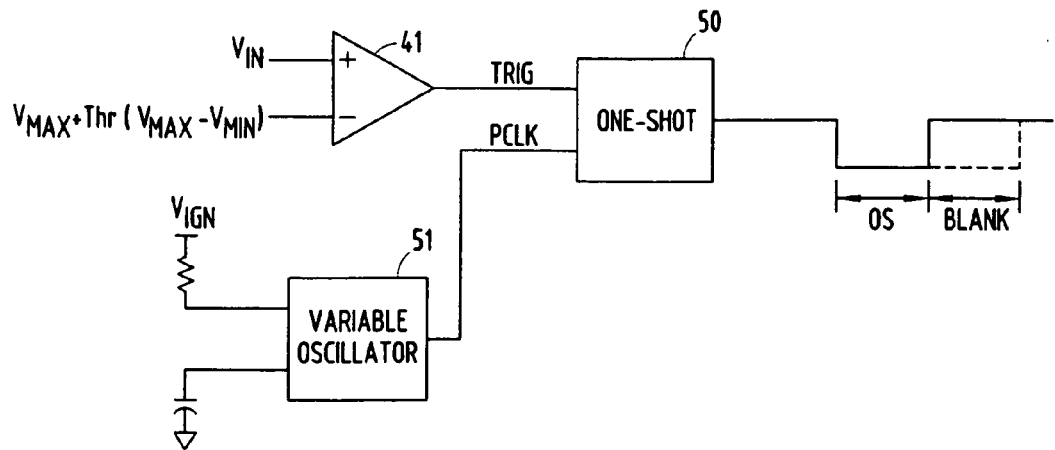
FIG. 10 is a circuit diagram illustrating a variable oscillator associated with the motor control system shown in FIG. 9.

Referring to FIG. 10, the oscillator 51 and one-shot circuitry 50 are illustrated according to one exemplary embodiment for generating one-shot and blanking pulses. The variable oscillator 51 receives as an input an ignition voltage VIGN (e.g., 12 Volts) of a vehicle. Ignition voltage VIGN is applied to a resistor to generate a reference current, which is equal to the ignition voltage divided by the value of the resistor. This reference current establishes the current source and sink level for charging and discharging an external capacitor through which the variable oscillator 51 is connected to ground. Because the variable oscillator 51 is connected to the ignition voltage VIGN, the oscillator 51 will provide a clock signal PCLK to one-shot circuitry 50 that is inversely proportional to the supply voltage VIGN level. Therefore, as VIGN increases, the one-shot and blanking time of the signal generated by one-shot circuitry 50 in response to a trigger signal from sensing and detection circuitry 41 will decrease linearly.

Figure 11:
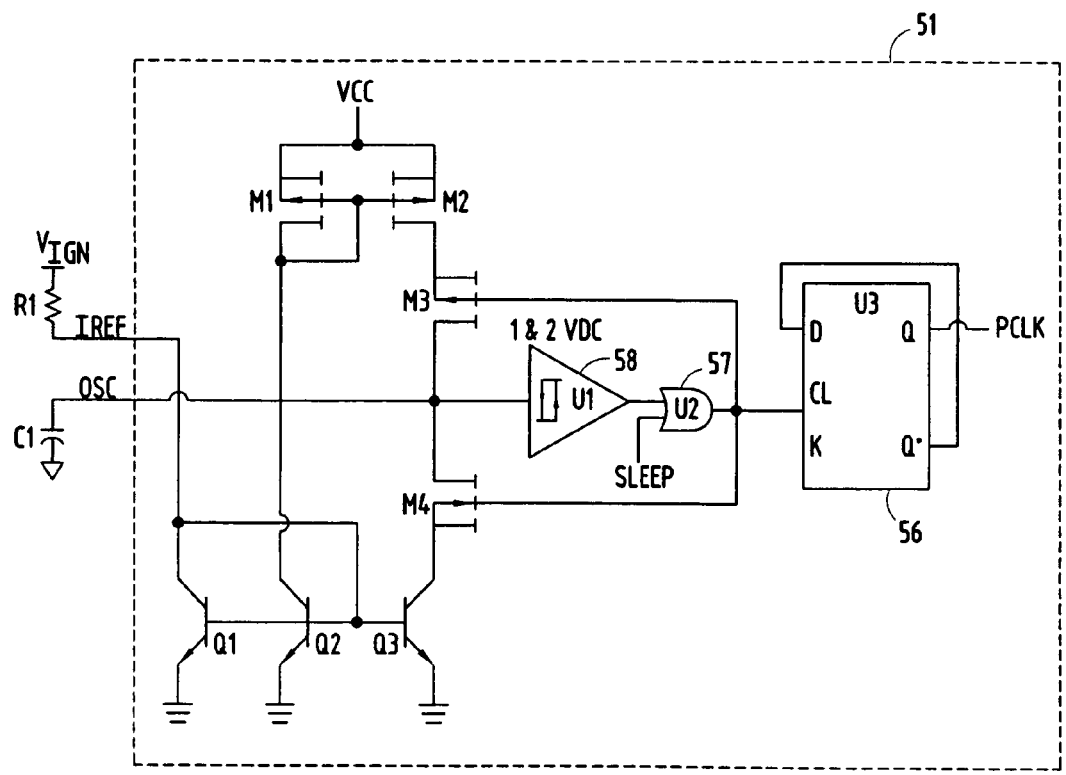
FIG. 11 is a circuit diagram further illustrating variable one-shot duration circuitry associated with the motor control system shown in FIG. 9.

FIG. 11 illustrates a detailed circuit implementation of an oscillator 51 that provides a PCLK signal to one-shot circuitry 50, according to another exemplary embodiment. $I_{Ref}$ is shown being equal to VIGN divided by R1. The bases of transistors Q2 and Q3 are in parallel with transistor Q1. Thus, the current flowing in the collector of Q1 is also the collector current of transistors Q2 and Q3. The collector current of transistor Q2 is the source of P-channel FET M1 gate to source shorted. The source current of M1 is equal to the source current of M2. This disables the N-channel FET M4 and enables the P-channel FET M3. The current source M2 is enabled and the current sink Q3 is disabled. The output voltage increases from 0 to 2 Volts DC. At this point, the outputs of 58 and 59 go from a logic 0 to a logic 1. This causes the flip-flop 56 to toggle states resulting in PCLK. This enables the N-channel FET M4 and disables the P-channel FET M3. The current source M2 is disabled and the current sink Q3 is enabled. The oscillator voltage continues to decrease linearly to one Volt (1V) DC. This disables the N-channel FET M4 and enables the P-channel FET M3. The current source M2 is enabled and the current sink Q3 is disabled. This ramping up-down voltage sequence continues indefinitely until the integrated circuit goes into a sleep mode. As noted above, the resulting output of the circuit generally illustrated in FIG. 11 is a PCLK signal that varies linearly with the voltage input to variable oscillator 51.

Figure 12:
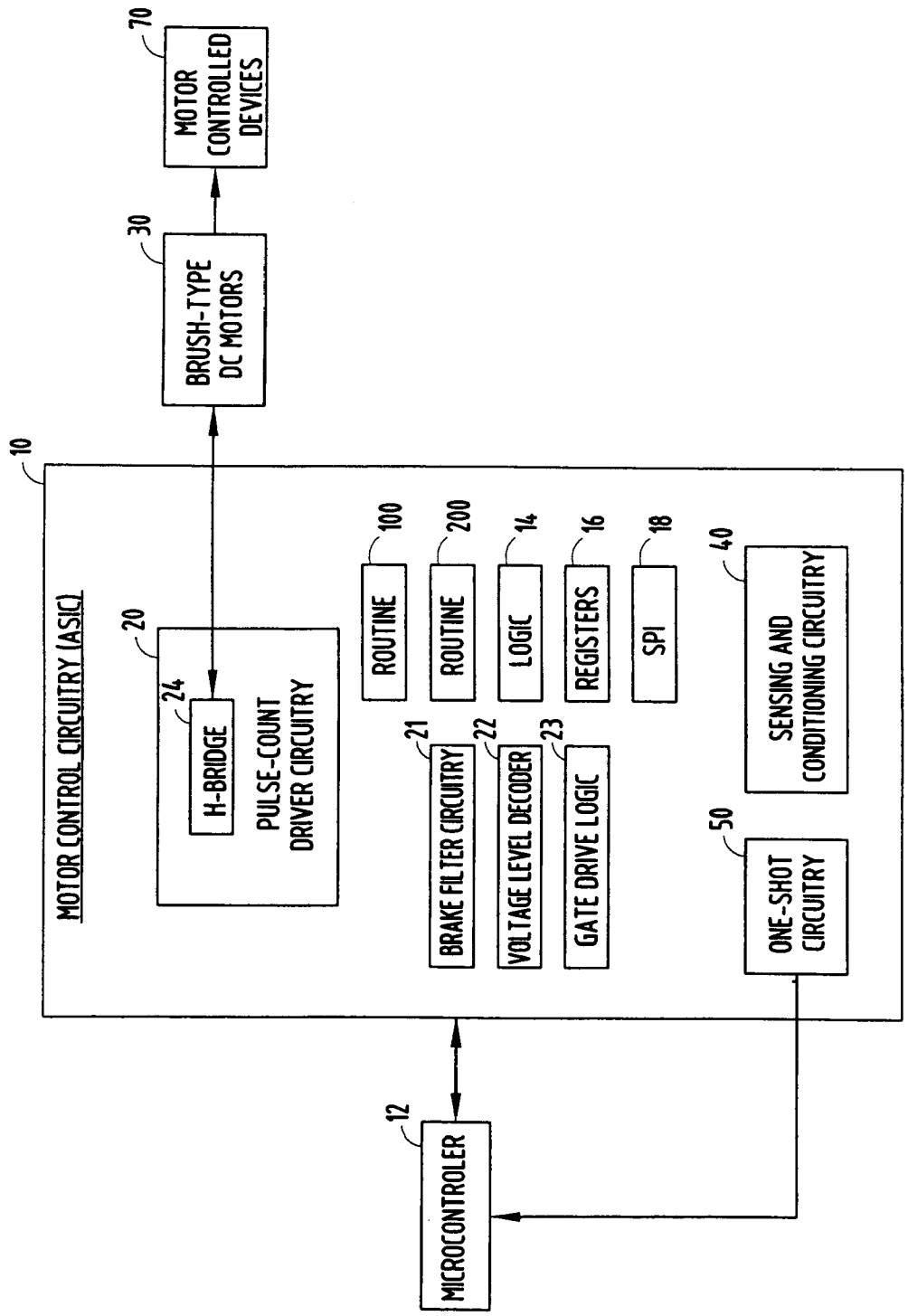
FIG. 12 is a block diagram illustrating an electronic motor control system, according to a third embodiment of the present invention.

Referring to FIG. 12, an electric motor control system is generally illustrated, according to a third embodiment of the present invention. In this embodiment, the motor control system includes brake filter circuitry 21, in addition to the other elements shown in the embodiment of FIG. 1. It should be appreciated that brake filter circuitry 21 could generally be included in the other embodiments. The motor control system according to this embodiment operates in a manner similar to the embodiment described in FIG. 1, with the added benefit that the motor shaft position detection system is improved by the addition of brake filter circuitry 21, making the system insensitive to the inductive kickback generated by shorting the motor windings when it is commanded to brake. Brake filter circuitry 21 does this by synchronizing the brake command received from microcontroller 12 with a one-shot pulse issued by one-shot circuitry 50.

Figure 13:
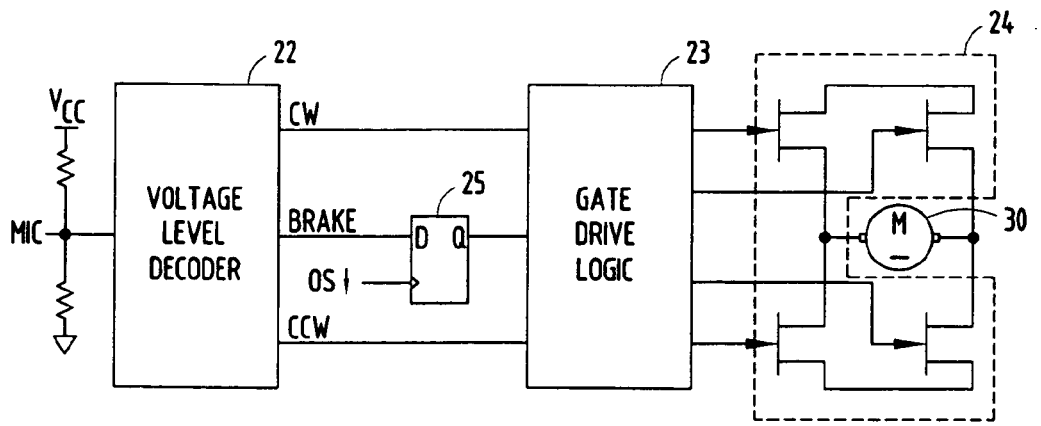
FIG. 13 is a circuit diagram illustrating a brake filtering circuit employed in the motor control system shown in FIG. 12.

FIG. 13 provides an exemplary embodiment of the brake filter circuitry 21 described in FIG. 12. When a brake command indicated by a microcontroller (MIC) input of voltage VCC/2 is issued by microcontroller 12, it is passed on by voltage level decoder 22 to flip-flop 25. A brake signal Q is only issued from flip-flop 25 to gate drive logic 20 after the falling edge of a subsequent one-shot pulse from one-shot circuitry 50 is received by flip-flop 25. The one-shot pulse issued by one-shot circuitry 50 is generated by a trigger from sensing and detection circuitry 40 indicating that a valid event has occurred. The one-shot pulse issued by one-shot circuitry 50 is followed by a blanking period, also known as a dead-time, to act to mask out noise from noise sources. As illustrated in FIGS. 12 and 13, the brake filter circuitry 21 effectively synchronizes the brake command received from microcontroller 12, with the one-shot pulse issued by one-shot circuitry 50. Using this system, energy from the inductive kickback created due to shorting the motor windings during a brake command does not create a false pulse via sensing and detection circuitry 40 and one-shot circuitry 50. As a result, a source of error is eliminated.

Figure 14:
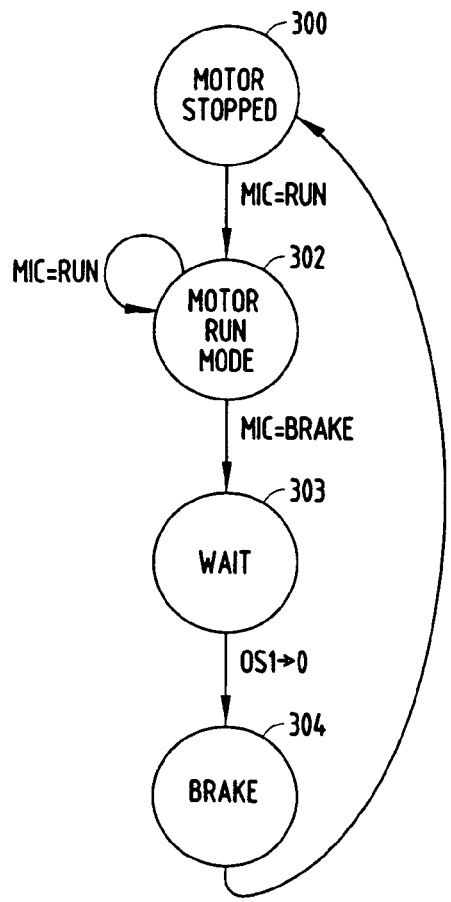
FIG. 14 is a state diagram of one embodiment of a control routine for the electronic motor control system shown in FIG. 12.

FIG. 14 is a state diagram generally illustrating the operation of the brake filter circuitry 21 employed in the motor control system of FIG. 12. While the motor is operating in run mode, it receives run signals from microcontroller 12. When microcontroller 12 issues a brake command, the brake filter circuitry 21 enters a wait state until a one-shot pulse is issued from one-shot circuitry 50. When the one-shot pulse from one-shot circuitry 50 has been received by the brake filter circuitry, the brake command is then passed on to the gate drive logic 23 and on to motors 30, causing them to brake and stop. Each of the motors begins to run again when run signals are received by the motor from microcontroller 12. It should be noted that brake filter circuitry 21 could be located anywhere within the motor control circuitry provided it is able to receive one-shot pulses from one-shot circuitry 50 and control and command signals from microcontroller 12, and provided it is able to issue signals to the gate drive logic controlling the motors 30.

Figure 15:
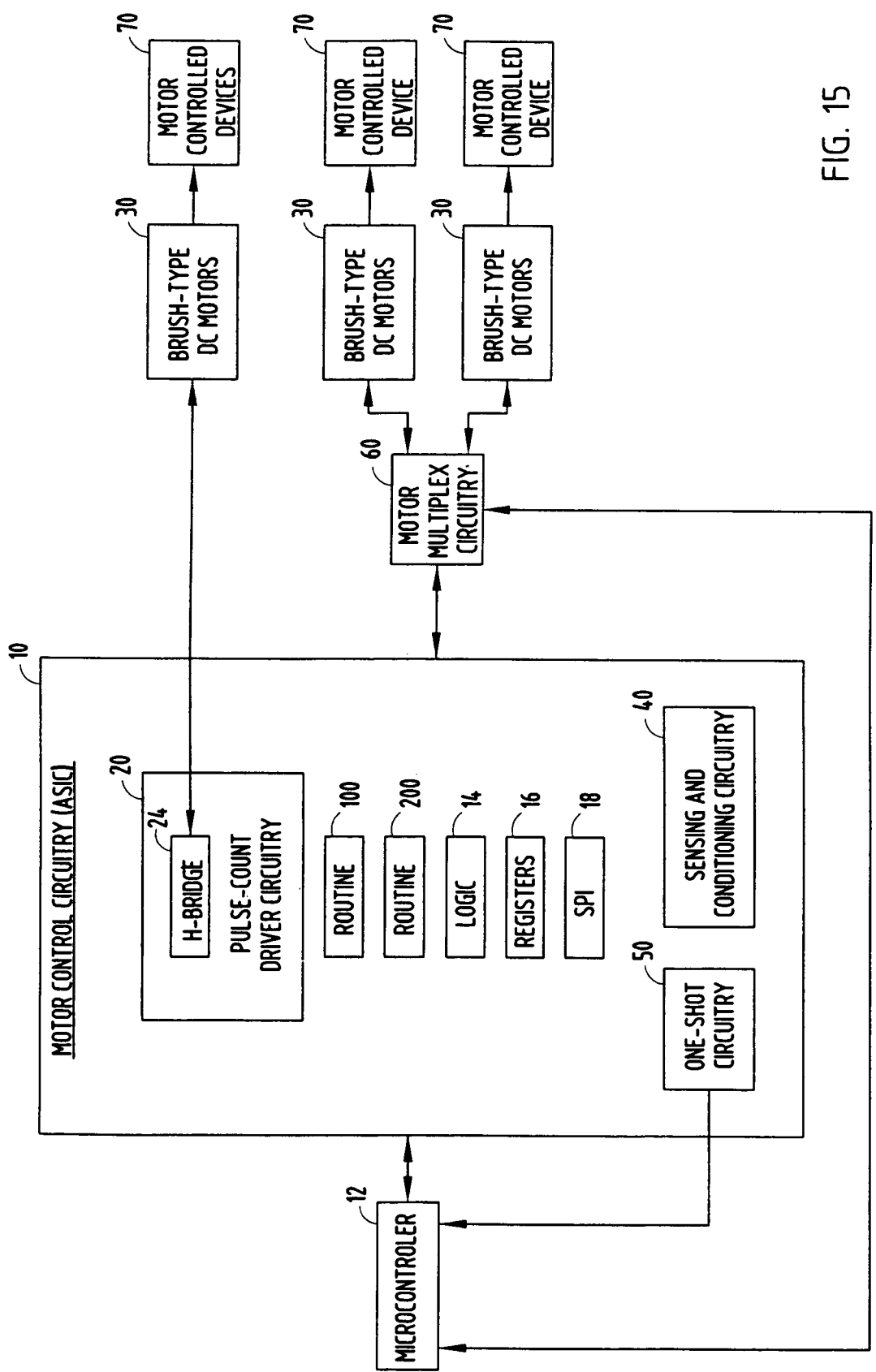
FIG. 15 is a block diagram illustrating an electronic motor control system, according to a fourth embodiment of the present invention.

Referring to FIG. 15, an electric motor control system is generally illustrated, according to a fourth embodiment of the present invention. This embodiment of the motor control system operates in a manner similar to the embodiment described in FIG. 1. However, the motor control system, according to the fourth embodiment, incorporates motor multiplex circuitry 60 for allowing motor control circuitry 10 and microcontroller 12 to control additional DC motors. Motor multiplex circuitry 60 receives signals from pulse count driver circuitry 20 and microcontroller 12, and uses those signals to control which of a plurality of multiplexed motors will be driven. It should be appreciated that any number of multiplexed motors may be controlled by the motor control system. Where communication occurs among any of motor multiplex circuitry 60, pulse count driver circuitry 20, microcontroller 12, one-shot circuitry 50, sensing and detection circuitry 40, and motor control circuitry 10, the means of communication may include, but is not limited to, SPI, I2C and LIN.

Figure 17:
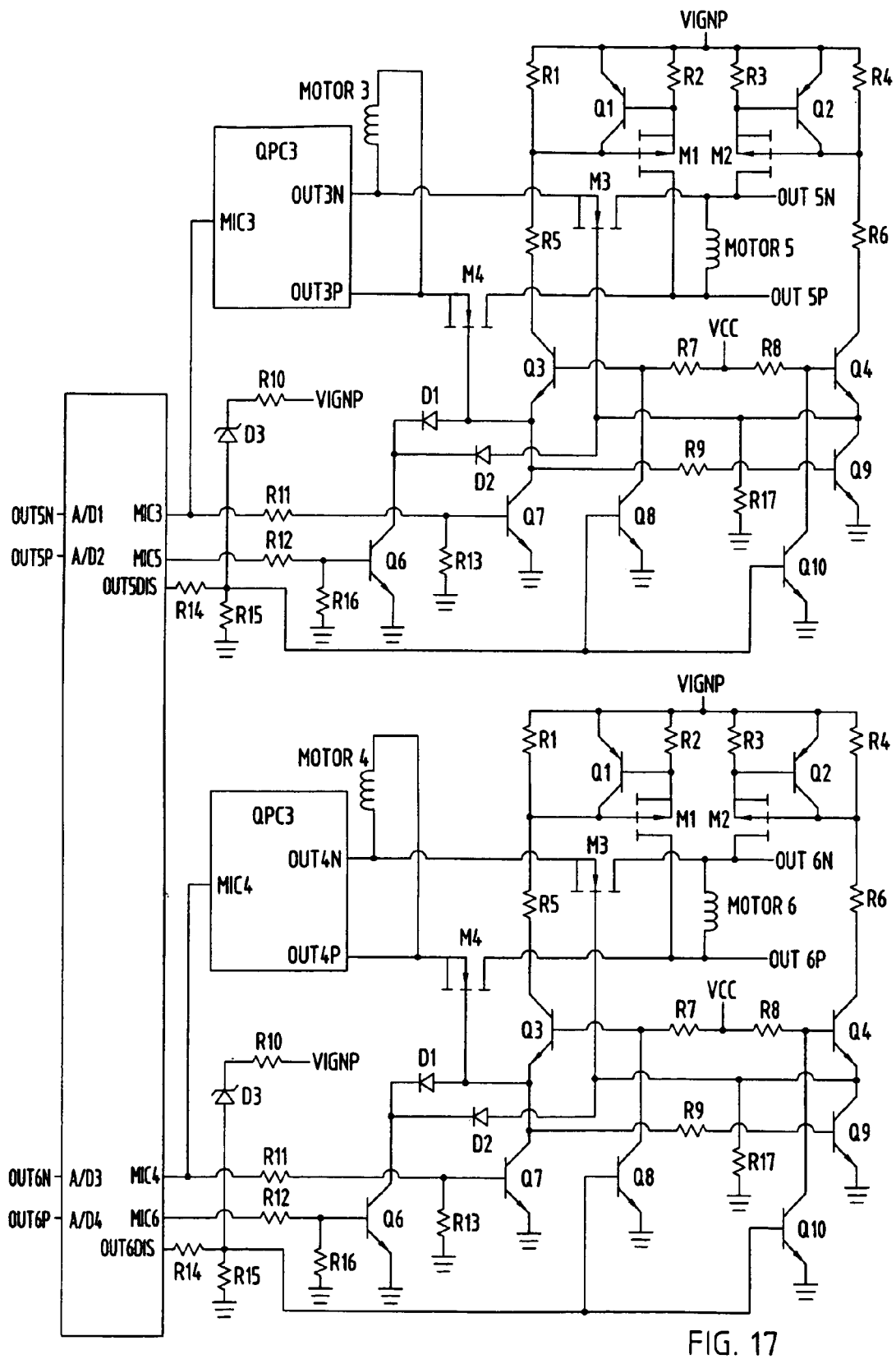
FIG. 17 is a circuit diagram illustrating motor multiplex control circuitry and interfaces employed in the motor control system shown in FIG. 15.

FIG. 17 illustrates exemplary circuitry for implementing the motor multiplex circuitry in the motor control system, according to the fourth embodiment. In this implementation, the pulse count motor driver shown as QPC3 includes four full H-bridge driver circuits, four high-side current sensing circuits, and four detection circuits. QPC3 and a microprocessor (corresponding to microcontroller 12 of FIG. 15) are shown connected to motor multiplex circuitry (corresponding to motor multiplex circuitry 60 of FIG. 15) that provides the capability to interface to two additional external motors (Motors 5 and 6 in FIG. 17). In this implementation, channels 3 and 4 of QPC3 are multiplexed with external driver circuitry of fifth and sixth channels, respectively. This motor control system results in the capability of controlling a total of six motors, with up to four motors able to operate simultaneously. In this exemplary configuration, only motor 3 or 5 and/or motor 4 or 6 can be operated at one time. However, other motor combinations can be combined to control different numbers and combinations of motors simultaneously.

The internal high-side driver output 3 illustrated in FIG. 17 is disabled with a predefined bit pattern (0101) written via serial communications to data input DI control bits of QPC3. The motor control input 5 shown as MIC5 can now transition from a logic 1 to a logic 0. The MIC3 input controls whether low-side drivers M2 or M4 are enabled. In the embodiment shown, M1 and M3 remain disabled. After motor 5 has completed its commanded movement, the MIC5 input can now transition from a logic 0 to a logic 1. This mode is subsequently exited when a subsequent bit pattern, i.e., non-0101, is written to the control bits of the DI register enabling normal H-bridge operation. Similarly, the internal high-side driver output 4 is disabled when a 1010 is written to the control bits of the DI SPI register bits 6 through 3. The MIC6 output can now transition from a logic 1 to a logic 0. The MIC4 inputs will control whether low-side FETs M2 or M4 are enabled. Note that M1 and M3 remain disabled. After motor 6 has completed its motor movement, the MIC6 input can now transition from a logic 0 to a logic 1. This mode is subsequently exited when a non-1010 pattern is written to the OSD3 through zero bits of the DI SPI register enabling normal H-bridge operation.

Two additional microprocessor outputs and inputs are employed for each interface. One output MIC5/6 enables or disables an external MUX switch. The second input is used to disable both P-channel FETs M1 and M2 under fault conditions, e.g., short to ground or over-voltage. The two A-D inputs monitor both sides of a motor for a short to ground condition. The state definitions for the various internal and external FETs illustrated in FIG. 17 and discussed above, are shown in FIG. 16.

The circuitry and method described above enables motor control circuitry 20 to interface to and drive additional DC motors 30. For example, a quad pulse count driver circuit normally capable of driving only four motors is able, using the motor control system, according to the fourth embodiment, to drive six total channels, up to four of those simultaneously, according to one example.

Figure 18:
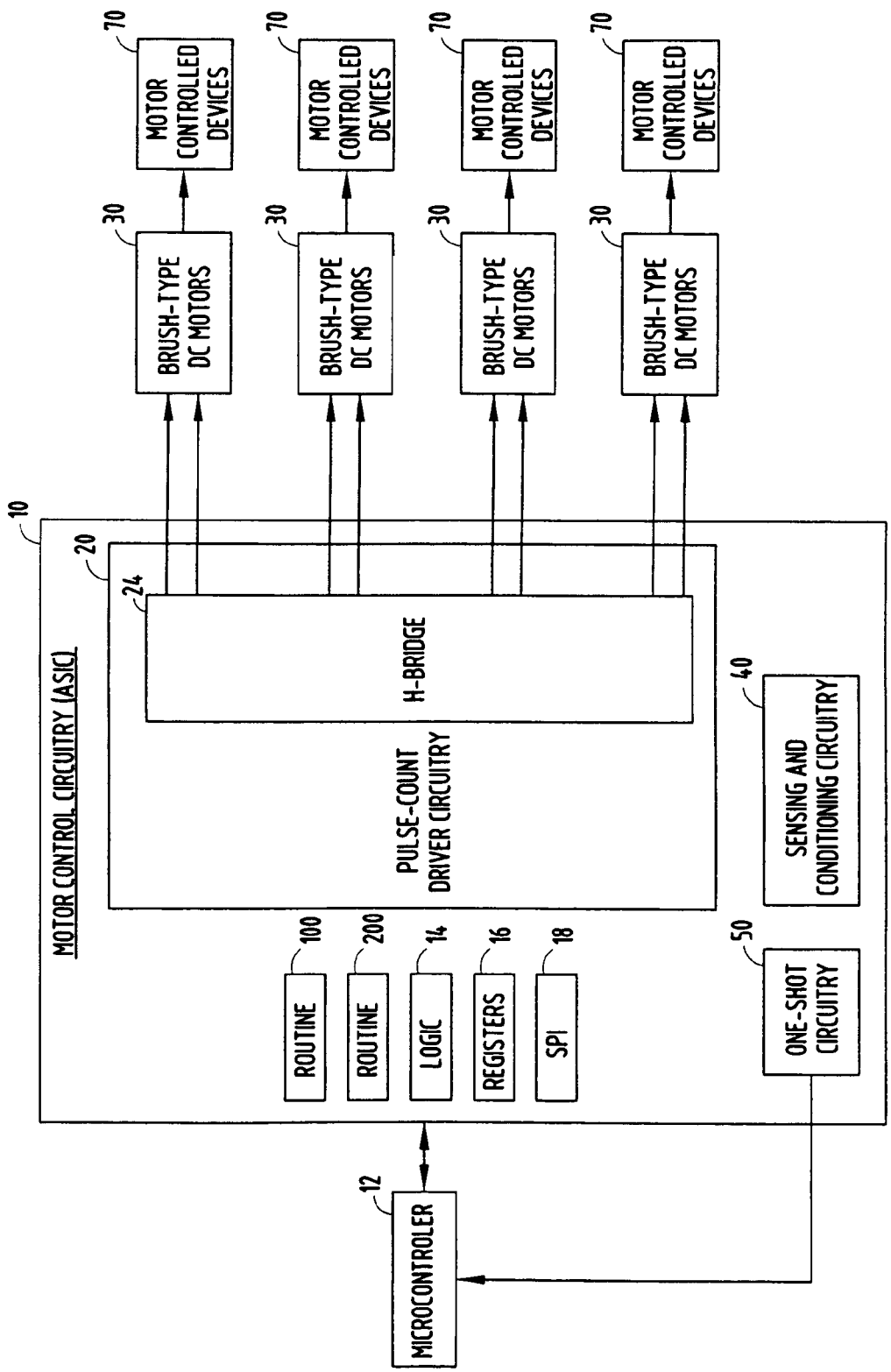
FIG. 18 is a block diagram illustrating an electronic motor control system, according to a fifth embodiment of the present invention.
Figure 19:
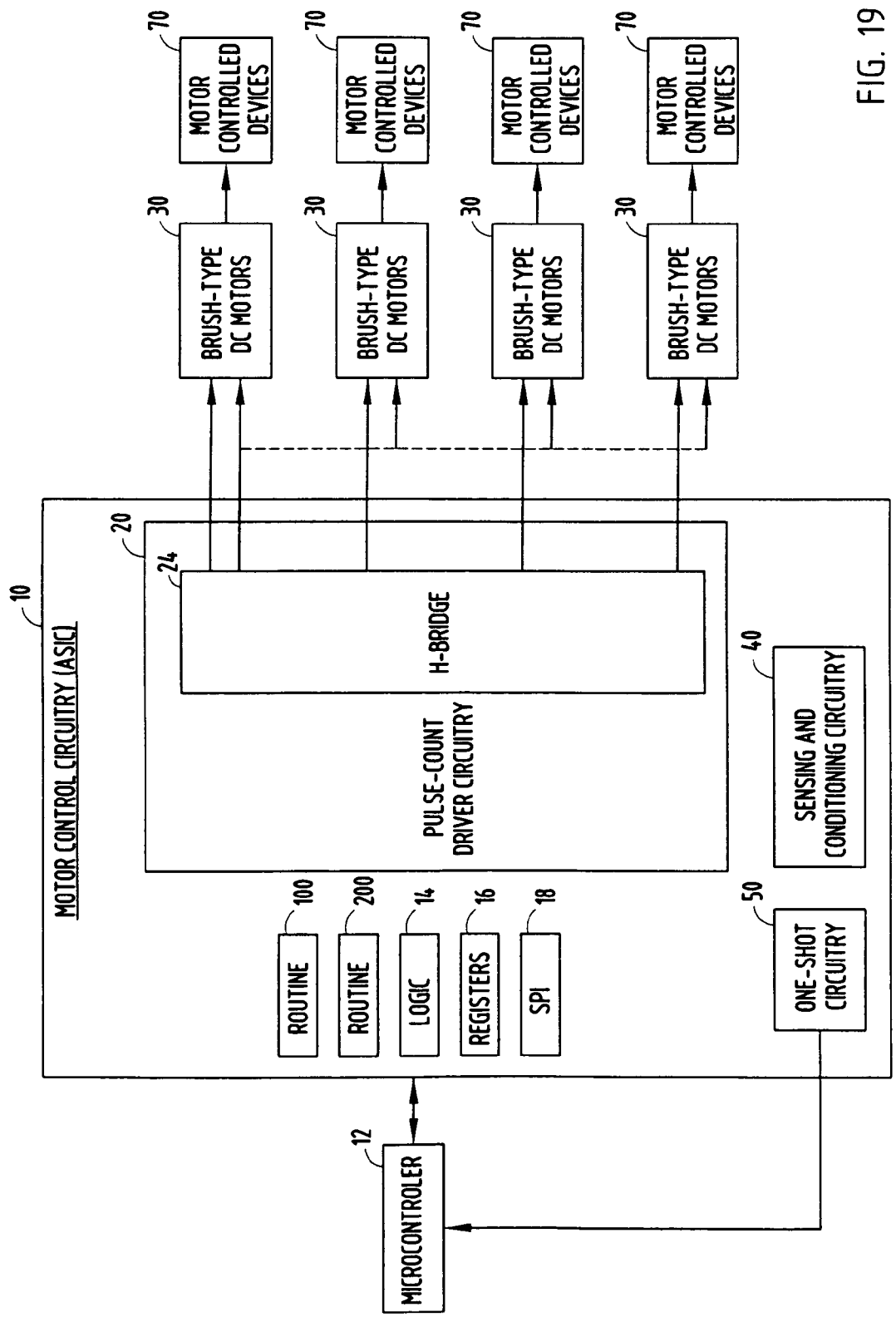
FIG. 19 is a block diagram illustrating an alternate configuration of the motor control system shown in FIG. 18.

Referring to FIGS. 18-19, a motor control system, according to a fifth embodiment of the present invention, is illustrated. The motor control system, according to the fifth embodiment, is similar to that described in FIG. 1, with the additional capability to switch between motor control modes. In FIG. 18, each of brush-type DC motors 30 is generally shown having a dedicated connection to a specific high-side driver of pulse count driver circuitry 20 and low-side driver of pulse count driver circuitry 20. Because each brush-type DC motor 30 has a dedicated connection to high- and low-side drivers associated with that specific motor, each motor 30 can simultaneously and independently be driven by pulse count driver circuitry 20. This is known as simultaneous drive operation.

FIG. 19 generally illustrates an electric motor control system similar to that illustrated in FIG. 18. However, in contrast to FIG. 18, which generally shows each brush-type DC motor having dedicated connection to high- and low-side drivers, FIG. 19 generally shows only one low-side driver being connected to multiple brush-type DC motors at the same time. In other words, although each brush-type DC motor 30 is generally shown on high input H having a dedicated connection to a specific high-side driver of pulse count driver circuitry 20, the brush-type DC motors 30 are generally shown on low input L sharing one low-side driver of pulse count driver circuitry 20. This configuration is known as sequential drive operation. In the sequential mode, because all of the H-bridges in the pulse count driver circuitry 20 share a common bottom side, additional wires between multiple low-side drivers and multiple brush-type DC motors 30 can be eliminated. However, in the sequential mode, only one brush-type DC motor can be driven at a time. In the sequential mode, the operation of the individual H-bridges depend on the state of the others because of the common bottom side driver connection. In contrast, in simultaneous mode, all H-bridges will respond to their individual control inputs and will work independent of the state of the other H-bridges. This allows each motor 30 to be operated independently of the other motors 30 and simultaneously. It should be understood that microcontroller 12, motor control circuitry 10, and pulse count driver circuitry 20 can generally be linked by the SPI connection and can communicate via that SPI connection.

The illustration of the embodiment shown in FIGS. 18 and 19 will now be described. When power is first applied to microcontroller 12 and motor control circuitry 10, microcontroller 12 writes values into registers 16 of motor control circuitry 10. These values are indicative of whether or not the microcontroller 12 wishes motor control circuitry 10 to control motors in sequential or simultaneous mode. Motor control circuitry 10 configures itself to control motors in sequential or simultaneous mode, based on the values that it finds stored in the registers 16. Motor control circuitry 10 will continue to control the motors in the selected simultaneous or sequential mode until power is removed from the circuit. When power is again restored to the circuit, microcontroller 12 will again write values to registers 16 indicating whether motor control circuitry 10 should operate in simultaneous or sequential mode. Typically, values are written from microcontroller 12 to motor control circuitry 10 via an SPI interface.

Figure 20:
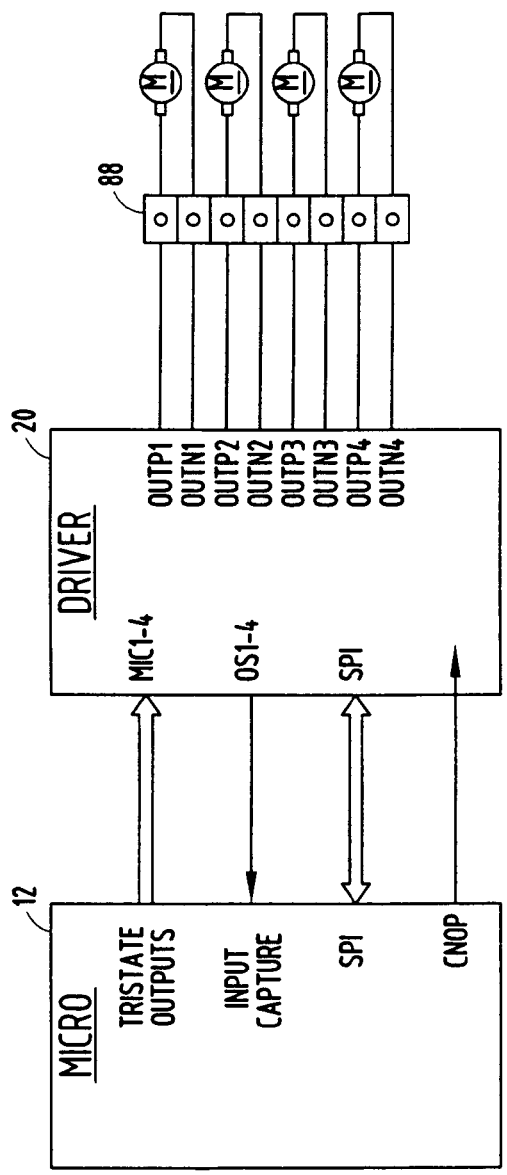
FIG. 20 is a block diagram further illustrating simultaneous control of the multiple DC motors in the system shown in FIG. 18.
Figure 21:
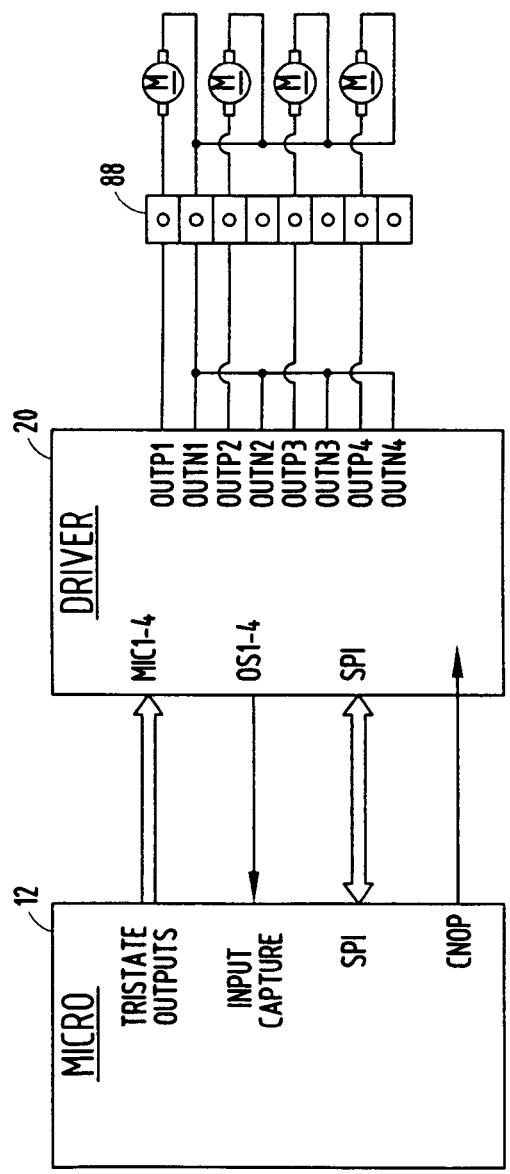
FIG. 21 is a block diagram illustrating sequential control of the multiple DC motors in the system shown in FIG. 18.

FIGS. 20-21 further illustrate the implementation of a simultaneous drive mode and sequential drive mode utilizing a microcontroller 12 and a driver circuit 20. In this embodiment, an SPI connection is shown provided between the microcontroller and driver circuitry. As noted above, pulse count driver circuitry 20 selects between the sequential and simultaneous configurations based on the state of bits written to a register by microcontroller 12 via an SPI bus to pulse count driver circuitry 20. Pulse count driver circuitry 20 is configured such that, when register bits are set, the pulse count driver circuitry 20 will operate in the sequential mode.

FIGS. 20-21 also illustrate a motor control system according to a sixth embodiment of the present invention. In this embodiment, pulse count driver circuitry 20 can be configured to monitor a bit (CNOP) from microcontroller 12 indicating when microcontroller 12 is not operating properly. Pulse count driver circuitry 20 can be configured such that, when it detects a CNOP bit, it will drive all four motors simultaneously in a predetermined direction. When this occurs, each motor 30 is independently driven in the predetermined direction until a stall condition is detected or until a master timeout event occurs. During this mode of operation, motor commutations are independently detected for each of the motors 30 for stall detection. FIG. 22 illustrates a state definition matrix for the FETs of drive circuitry in the embodiment shown in FIGS. 20 and 21 utilizing a quad pulse count driver integrated circuit configured to simultaneously drive all four motors in a predetermined direction when an SPI bit indicates an error condition. The control system of this sixth embodiment provides a benefit of allowing the pulse count driver circuitry 20 to simultaneously drive all connected motors 30 in a predetermined direction, when control circuitry 10 is not operating properly.

Figure 23:
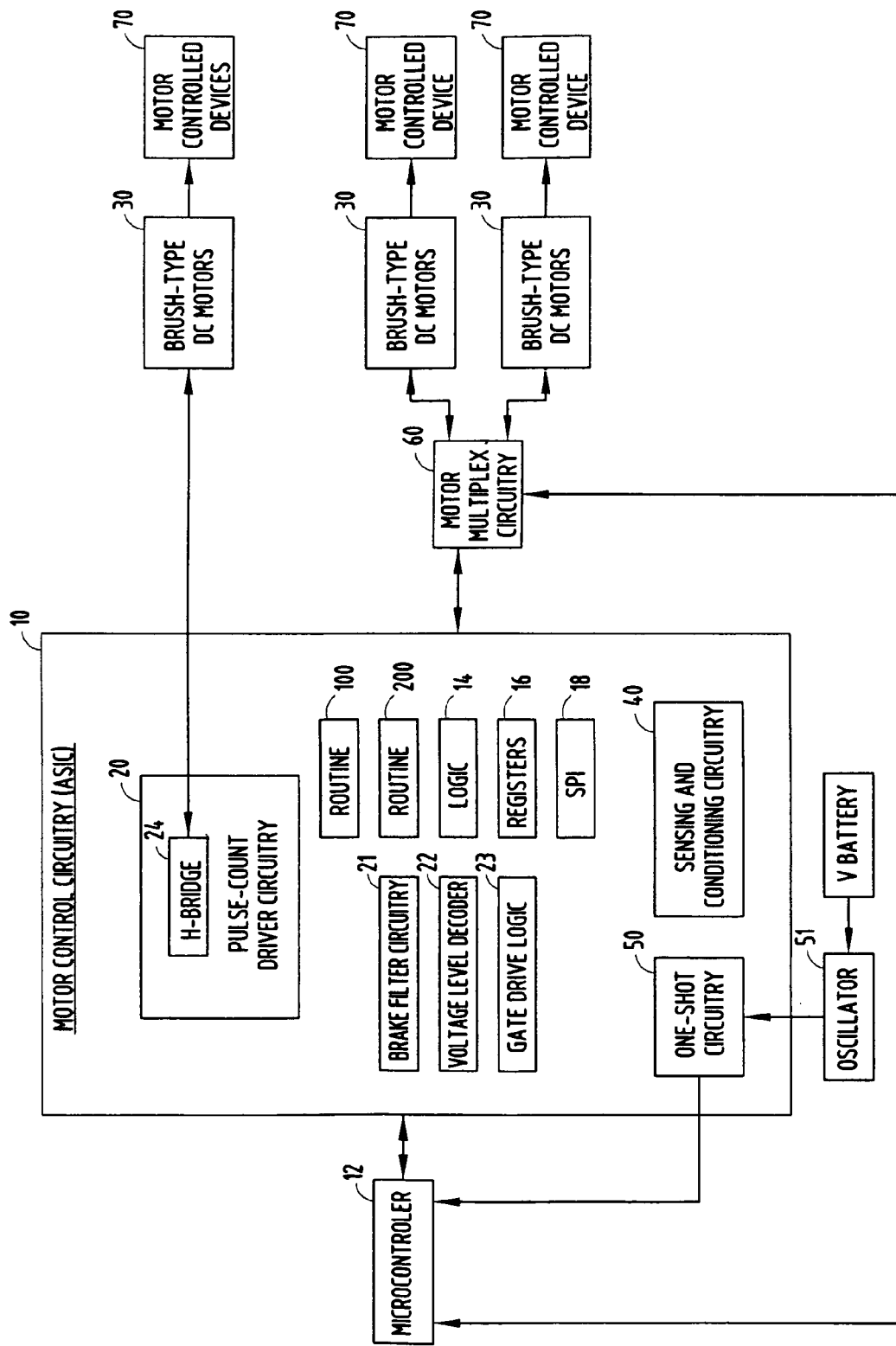
FIG. 23 is a block diagram illustrating an electronic motor control system implementing together features of various embodiments of the present invention.

FIG. 23 generally illustrates a motor control system, according to a sixth embodiment, in which multiple aspects of the previously discussed embodiments are used together. The combined elements include the improved sensing and detection circuitry 40 and method for more reliable detecting the rotor position of brush-type DC motors 30, an oscillator 51 connected to the battery voltage ($V_{BATTERY}$) for linearly varying duration of pulses issuing from the one-shot circuitry 50 in response to signals received from sensing and detection circuitry 40, brake filter circuitry 21 for synchronizing the issuance of braking signals with pulses issued from one-shot circuitry 50, thereby eliminating another source of error in the detected rotor positions, and rotor multiplex circuitry 60 for enabling pulse count driver circuitry 20 to control and drive additional DC motors 30. In addition, motor control circuitry 10 and pulse count driver circuitry 20 are capable of receiving SPI and error signals from microcontroller 12 and using those signals to select between sequential and simultaneous drive modes and to drive the connected motors 30 in a clockwise direction, when an error mode is detected.

As noted above, the motor control systems, according to the various disclosed embodiments, contribute to improve systems for controlling brush-type DC motors 30 by increasing the number of motors 30 that can be controlled by a given control system, improving the quality of the signals detected in the signal conditioning circuitry, allowing the control system to easily switch between multiple control modes, and allowing the system to be responsive to system error conditions, among other advantages. While the motor control systems of the present invention are particularly well suited for brush-type DC motors, it should be appreciated that certain aspects of the present invention may be implemented to control other types of motors.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims, as interpreted according to the principles of patent law, including the doctrine of equivalents.

The invention claimed is:

1. A method for multiplexing external drivers to a pulse count driver, comprising the steps of:
    providing motor drive circuitry external to a microprocessor and pulse count driver circuit, said external circuitry interfacing with at least two DC motors and configured to control said motors; and
    issuing selection and control signals from said microprocessor to said pulse count driver circuit and said external circuitry, said selection signals being used by said pulse count driver circuit and external circuitry to select which of the at least two DC motors will be responsive to said control signals, and said control signals controlling said selected motors.

2. The method as defined in claim 1, wherein the method is employed on a vehicle.

3. The method as defined in claim 1, wherein at least one of the DC motors is a brush-type motor.

4. The method as defined in claim 1, wherein at least one of said issued selection and control signals is transmitted via a serial bus.

5. The method as defined in claim 1, wherein the pulse count driver circuit comprises a plurality of H-bridge drivers.

6. The method as defined in claim 5, wherein the plurality of H-bridge drivers are provided in an ASIC.

7. The method as defined in claim 1, wherein the external circuitry multiplexes the selection and control signals for the at least two DC motors using a single IC channel.

8. A system for multiplexing external drivers to a pulse count driver, comprising:
    a pulse count driver circuit configured to control DC motors;
    a microprocessor configured to issue selection and control signals to said pulse count driver circuit; and
    circuitry groups external to said pulse count driver circuit and said microprocessor, each of said circuitry groups configured to receive selection and control signals from said pulse count driver circuit and said microprocessor, and said circuitry groups selecting and controlling at least two DC motors based on signals from said microprocessor and said pulse count driver circuit.

9. The system as defined in claim 8, wherein the system is employed on a vehicle.

10. The system as defined in claim 8, wherein at least one of the DC motors is a brush-type motor.

11. The system as defined in claim 8, wherein at least one of said issued selection and control signals is transmitted via a serial bus.

12. The system as defined in claim 8, wherein the pulse count driver circuit comprises a plurality of H-bridge drivers.

13. The system as defined in claim 12, wherein the plurality of H-bridge drivers are provided in an ASIC.

14. The system as defined in claim 8, wherein the external circuitry multiplexes the selection and control signals for the at least two DC motors using a single IC channel.

* * * * *